United States Patent
Ueda et al.

(10) Patent No.: US 7,311,508 B2
(45) Date of Patent: Dec. 25, 2007

(54) CONTROL DEVICE FOR INJECTION MOLDING MACHINE

(75) Inventors: Koichiro Ueda, Tokyo (JP); Makoto Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 300 days.

(21) Appl. No.: 10/546,196

(22) PCT Filed: Dec. 18, 2003

(86) PCT No.: PCT/JP03/16250

§ 371 (c)(1),
(2), (4) Date: Aug. 18, 2005

(87) PCT Pub. No.: WO2005/061206

PCT Pub. Date: Jul. 7, 2005

(65) Prior Publication Data

US 2006/0093695 A1 May 4, 2006

(51) Int. Cl.
*B29C 45/80* (2006.01)

(52) U.S. Cl. .................................................. 425/150
(58) Field of Classification Search ................. 425/150
See application file for complete search history.

(56) References Cited

U.S. PATENT DOCUMENTS 6,089,849 A * 7/2000 Bulgrin et al. ............... 425/149
6,409,495 B1  6/2002 Kamiguchi et al.

FOREIGN PATENT DOCUMENTS

| EP | 737560 A1 | 10/1996 |
|---|---|---|
| EP | 1072388 A2 | 1/2001 |
| JP | 3-101914 A | 4/1991 |
| JP | 3-48014 B2 | 7/1991 |
| JP | 6-23818 A | 2/1994 |
| JP | 7-241896 A | 9/1995 |
| JP | 2515355 B2 | 4/1996 |
| JP | 2001-30326 A | 2/2001 |

* cited by examiner

*Primary Examiner*—Tim Heitbrink
(74) *Attorney, Agent, or Firm*—Sughrue Mion, PLLC

(57) ABSTRACT

A control device includes: a memory 29r for storing, in a process from a mold tool 10 being open until being closed, the value X(t) of a current flowing in a motor 3 at multiple points in time synchronized to the closing command signal; a mean-and-variance calculating for each of the points in time means for calculating a mean value Mx(t) and a variance value Vx(t) that correspond to current values X(t) that have been read from the memory 29r; a threshold calculating means for calculating a current threshold Xf(t) for each of the points in time using the mean value Mx(t) and the variance value Vx(t) from an arbitrary number of times up to (A−1) times, according to the following equation:
$Xf(t)=Mx(t)+N \cdot \{Vx(t)\}^{1/2}$ where N is a constant and not less than 3; and a foreign object determining unit 29 for comparing the current threshold Xf(t) and the current value X(t) at each of the points in time to determine whether there is an abnormality according to whether the current value X(t) exceeds the current threshold Xf(t) a predetermined number m of times.

57 Claims, 15 Drawing Sheets

FIG. 2

(a) CURRENT AT EACH SAMPLING TIME FOR LAST K CYCLES

|   | 0 | 1 | 2 | ... | T-1 |
|---|---|---|---|---|---|
| 0 | $x_0(0)$ | $x_0(1)$ | $x_0(2)$ | ... | $x_0(T-1)$ |
| 1 | $x_1(0)$ | $x_1(1)$ | $x_1(2)$ | ... | $x_1(T-1)$ |
| 2 | $x_2(0)$ | $x_2(1)$ | $x_2(2)$ | ... | $x_2(T-1)$ |
|   |   |   | ... |   |   |
| p | $x_p(0)$ | $x_p(1)$ | $x_p(2)$ | ... | $x_p(T-1)$ |
|   |   |   | ... |   |   |
| K-1 | $x_{K-1}(0)$ | $x_{K-1}(1)$ | $x_{K-1}(2)$ | ... | $x_{K-1}(T-1)$ |

(b) RING BUFFER POINTER

| POINTER | p |
|---|---|

(c) MEAN, VARIANCE, SUM, AND SUM OF SQUARES OF CURRENT AT EACH SAMPLING TIME

| TIME | 0 | 1 | 2 | ... | T-1 |
|---|---|---|---|---|---|
| MEAN | Mx(0) | Mx(1) | Mx(2) | ... | Mx(T-1) |
| VARIANCE | Vx(0) | Vx(1) | Vx(2) | ... | Vx(T-1) |
| SUM | Sx(0) | Sx(1) | Sx(2) | ... | Sx(T-1) |
| SUM OF SQUARES | Ux(0) | Ux(1) | Ux(2) | ... | Ux(T-1) |

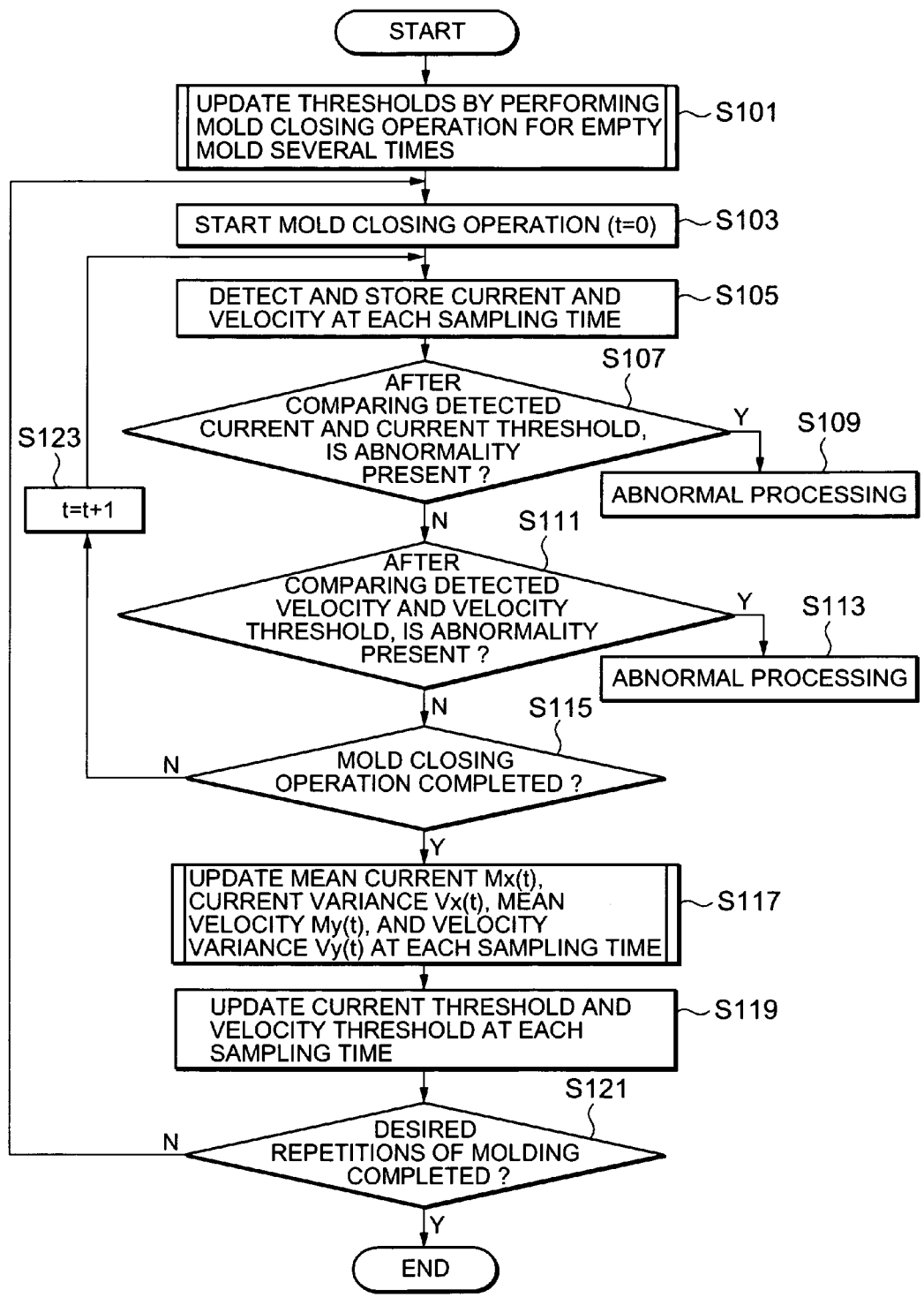

(a) DETECTED CURRENT VALUE AT EACH SAMPLING TIME FOR LAST ONE CYCLE

| TIME | 0 | 1 | 2 | ... | T-1 |
|---|---|---|---|---|---|
| DETECTED VALUE | X(0) | X(1) | X(2) | ... | X(T-1) |

(b) MEAN CURRENT AT EACH SAMPLING TIME

| TIME | 0 | 1 | 2 | ... | T-1 |
|---|---|---|---|---|---|
| MEAN | Mx(0) | Mx(1) | Mx(2) | ... | Mx(T-1) |

(c) CURRENT VARIANCE AT EACH SAMPLING TIME

| TIME | 0 | 1 | 2 | ... | T-1 |
|---|---|---|---|---|---|
| VARIANCE | Vx(0) | Vx(1) | Vx(2) | ... | Vx(T-1) |

CONTROL DEVICE FOR INJECTION MOLDING MACHINE

TECHNICAL FIELD

A first instance of the conventional art for a control device for a conventional injection molding machine is described in Japanese Patent Publication No. 2515355, and a second instance of the conventional art is described in Japanese Patent Publication No. 3080617. In the first instance of the conventional art, when a mold closing operation is completed normally, the electrical current at each point in time during the normal mold closing operation is designated as a reference value, and the reference value plus an offset value is designated as a threshold. In the next mold closing operation, the previous threshold and the electrical current in the present mold closing operation are compared. If the electrical current in the present mold closing operation is larger, it is determined that a malfunction has arisen in the mold tool.

In the second instance of the conventional art, a disturbance observer is installed to estimate disturbance torque at each point in time. A threshold is calculated by adding a shift amount K, for determining a tolerance range, to the mean value of disturbance torques during a plurality of repetitions of the mold closing operation in a prior normal period. The threshold and the disturbance torque estimated for the present mold closing operation are compared. If the present disturbance torque exceeds the threshold, it is determined that a malfunction is present.

However, in the first and the second instances of the conventional art, performance for detection of foreign objects significantly varies depending on the values designated for the offset or the shift amount. Specifically, if the offset value is designated to be too small, although sensitivity is enhanced, erroneous detection occurs. Conversely, if the offset value is designated to be too large, erroneous detection can be prevented, but foreign objects cannot be detected with good sensitivity. Therefore, there has been a problem in that, in order to find an appropriate offset value, the reference value/mean value must be compared, on a display or the like, with the detected current value/estimated disturbance torque value, and the offset/shift amount must be manually adjusted by trial and error in order that in the normal state the detected current value or the estimated disturbance torque does not exceed the threshold.

Moreover, there has been another problem in that, since the most appropriate offset value is different depending on the mold or the mold closing operation command pattern for molding, the offset amount or the shift amount must be adjusted again when the mold or the mold closing operation command pattern is changed.

Furthermore, there has been another problem in that in the conventional art the offset/shift amount from the reference value/mean value is designated uniformly, yet the most appropriate offset/shift amount varies at each point in time depending on such factors as the type of mold.

DISCLOSURE OF THE INVENTION

The invention is made to resolve the above-described problems, and aims to provide a control device for an injection molding machine, in which thresholds for determination can be automatically acquired, and it can be determined at an early stage according to the thresholds whether a foreign object is present within the mold tool—whether normal or abnormal.

In a control device for an injection molding machine, for opening and closing a mold tool by driving a motor based on an opening and a closing command signal, the control device for an injection molding machine relevant to a first aspect of the invention includes: a current detection means for, in a process from the mold tool being open until being closed, detecting at multiple points in time synchronized to the closing command signal the value X(t) of a current flowing in the motor; a storage means for storing, with the process being repeated A times, respective current values X(t) corresponding to each of the points in time; a mean-and-variance calculating means for calculating for each of the points in time a mean value Mx(t) and a variance value Vx(t) that correspond to current values X(t) that have been read from the storage means; a threshold calculating means for calculating a current threshold Xf(t) for each of the points in time using the mean value Mx(t) and the variance value Vx(t) from an arbitrary number of times up to (A−1) times, according to the following equation:

$$Xf(t)=Mx(t)+N\cdot\{Vx(t)\}^{1/2}$$

where N is a constant and not less than 3; and a determining means for comparing the current threshold Xf(t) and the current value X(t) at each of the points in time to determine whether there is an abnormality according to whether the current value X(t) exceeds the current threshold Xf(t) a predetermined number m of times.

In a control device for an injection molding machine, for opening and closing a mold tool by driving a motor based on an opening and a closing command signal, the control device for an injection molding machine relevant to a second aspect of the invention includes: a detection means for, in a process from the mold tool being open until being closed, detecting at multiple points in time synchronized to the closing command signal the value Y(t) of the velocity or position of the motor; a storage means for storing, with the process being repeated A times, respective velocity or position values Y(t) corresponding to each of the points in time; a mean-and-variance calculating means for calculating for each of the points in time a mean value My(t) and a variance value Vy(t) that correspond to velocity or position values Y(t) that have been read from the storage means; a threshold calculating means for calculating a velocity or position threshold Yf(t) for each of the points in time using the mean value My(t) and the variance value Vy(t) from an arbitrary number of times up to (A−1) times, according to the following equation:

$$Yf(t)=My(t)-N\cdot\{Vy(t)\}^{1/2}$$

where N is a constant and not less than 3; and a determining means for comparing the threshold Yf(t) and the velocity or position value Y(t) at each of the points in time to determine whether there is an abnormality according to whether the velocity or position value Y(t) is below the threshold Yf(t) a predetermined number m of times.

In a control device for an injection molding machine, for opening and closing a mold tool by driving a motor based on an opening and a closing command signal, the control device for an injection molding machine relevant to a third aspect of the invention includes: a current detection means for, in a process from the mold tool being open until being closed, detecting at multiple points in time synchronized to the closing command signal the value X(t) of a current flowing in the motor; a storage means for storing, with the process being repeated A times, respective current values X(t) corresponding to each of the points in time; a mean-and-variance calculating means for calculating for each of the points in time a mean value Mx(t) and a variance value Vx(t) of current values X(t) that have been read from the storage means; a normalization calculating means for converting the current values X(t) for each of the points in time into normalized values Zx(t) using the mean value Mx(t) and the variance value Vx(t) from an arbitrary number of times up to (A−1) times, according to the following equation:

$$Zx(t)=\{X(t)-Mx(t)\}/\{Vx(t)\}^{1/2};\ and$$

a determining means for, after determining whether the normalized value Zx(t) at each of the points in time exceeds a predetermined value N'(N'>2), if the normalized value exceeds the predetermined value N', determining whether there is an abnormality according to whether the normalized value Zx(t) exceeds the normalized value Zx(t−1), at one point in time prior to that of the normalized value Zx(t), a predetermined number m' of times.

In a control device for an injection molding machine, for opening and closing a mold tool by driving a motor based on an opening and a closing command signal, the control device for an injection molding machine relevant to a fourth aspect of the invention includes: a detection means for, in a process from the mold tool being open until being closed, detecting at multiple points in time synchronized to the closing command signal the value Y(t) of the velocity or position of the motor; a storage means for storing, with the process being repeated A times, respective velocity or position values Y(t) corresponding to each of the points in time; a mean-and-variance calculating means for calculating for each of the points in time a mean value My(t) and a variance value Vy(t) of velocity or position values Y(t) that have been read from the storage means; a normalization calculating means for converting the velocity values Y(t) for each of the points in time into normalized values Zy(t) using the mean value My(t) and the variance value Vy(t) from an arbitrary number of times up to (A−1) times, according to the following equation:

$$Zy(t)=\{Y(t)-My(t)\}/\{Vy(t)\}^{1/2};\ and$$

a determining means for, after determining whether the normalized value Zy(t) at each of the points in time is below a predetermined value −N'(N'>2), if the normalized value is below the predetermined value −N', determining whether there is an abnormality according to whether the normalized value Zy(t) is below the normalized value Zy(t−1), at one point in time prior to that of the normalized value Zy(t), a predetermined number m' of times.

In a control device for an injection molding machine, for opening and closing a mold tool by driving a motor based on an opening and a closing command signal, the control device for an injection molding machine relevant to a fifth aspect of the invention includes: a detection means for detecting the rotational position of the motor as a detected position; a control means for controlling the motor based on a position deviation that is the difference between a commanded position and the detected position; a storage means for storing, in a process from the mold tool being open until being closed, with the process being repeated A times, respective position deviation values E(t) corresponding to each of multiple points in time synchronized to the closing command signal; a mean-and-variance calculating means for calculating for each of the points in time a mean value Me(t) and a variance value Ve(t) that correspond to position deviation values E(t) that have been read from the storage means; a threshold calculating means for calculating a position deviation threshold Ef(t) for each of the points in time using the mean value Me(t) and the variance value Ve(t) from an arbitrary number of times up to (A−1) times, according to the following equation:

$$Ef(t)=Me(t)+N\cdot\{Ve(t)\}^{1/2}$$

where N is a constant and not less than 3; and a determining means for comparing the position deviation threshold Ef(t) and the position deviation value E(t) at each of the points in time to determine whether there is an abnormality according to whether the position deviation value E(t) exceeds the position deviation threshold Ef(t) a predetermined number m of times.

In a control device for an injection molding machine, for opening and closing a mold tool by driving a motor based on an opening and a closing command signal, the control device for an injection molding machine relevant to a sixth aspect of the invention includes: a detection means for detecting the rotational position of the motor as a detected position; a control means for controlling the motor based on a position deviation that is the difference between a commanded position and the detected position; a storage means for storing, with the opening/closing process being repeated A times, respective position deviation values E(t) corresponding to each of points in time; a mean-and-variance calculating means for calculating for each of the points in time a mean value Me(t) and a variance value Ve(t) of position deviation values E(t) that have been read from the storage means; a normalization calculating means for converting the position deviation values E(t) for each of the points in time into normalized values Ze(t) using the mean value Me(t) and the variance value Ve(t) from an arbitrary number of times up to (A−1) times, according to the following equation:

$$Ze(t)=\{E(t)-Me(t)\}/\{Ve(t)\}^{1/2};\ and$$

a determining means for, after determining whether the normalized value Zy(t) at each of the points in time exceeds a predetermined value N'(N'>2), if the normalized value exceeds the predetermined value N', determining whether there is an abnormality according to whether the normalized value Ze(t) exceeds the normalized value Ze(t−1), at one point in time prior to that of the normalized value Ze(t), a predetermined number m' of times.

Based on the first or third aspect of the invention, the control device for an injection molding machine relevant to a seventh aspect of the invention includes: a current limiting means for limiting the current flowing in the motor when the current reaches a predetermined current limit value; a detection means for detecting the rotational position of the motor as a detected position; a control means for controlling the motor based on a position deviation that is the difference between a commanded position and the detected position; a storage means for storing, with the process being repeated A times, respective position deviation values E(t) corresponding to each of the points in time; a mean-and-variance calculating means for calculating for each of the points in time a mean value Me(t) and a variance value Ve(t) that correspond to position deviation values E(t) that have been read from the storage means; a threshold calculating means for calculating a position deviation threshold Ef(t) for each of the points in time using the mean value Me(t) and the variance value Ve(t) from an arbitrary number of times up to (A−1) times, according to the following equation:

$$Ef(t)=Me(t)+N\cdot\{Ve(t)\}^{1/2}$$

where N is a constant and not less than 3; and a determining means for comparing the position deviation threshold Ef(t) and the position deviation value E(t) at each of the points in time to determine whether there is an abnormality according to whether the position deviation value E(t) exceeds the position deviation threshold Ef(t) a predetermined number m of times.

Based on the first or third aspect of the invention, the control device for an injection molding machine relevant to an eighth aspect of the invention includes: a current limiting means for limiting the current flowing in the motor when the current reaches a predetermined current limit value; a control means for controlling the motor based on a position deviation that is the difference between a commanded position and the detected position; a storage means for storing, with the process being repeated A times, respective position deviation values E(t) corresponding to each of the points in time; a mean-and-variance calculating means for calculating for each of the points in time a mean value Me(t) and a variance value Ve(t) of position deviation values E(t) that have been read from the storage means; a normalization calculating means for converting the position deviation values E(t) for each of the points in time into normalized values Ze(t) using the mean value Me(t) and the variance value Ve(t) from an arbitrary number of times up to (A−1) times, according to the following equation:

$$Ze(t)=\{E(t)-Me(t)\}/\{Ve(t)\}^{1/2};\text{ and}$$

a determining means for, after determining whether the normalized value Zy(t) at each of the points in time exceeds a predetermined value N'(N'>2), if the normalized value exceeds the predetermined value N', determining whether there is an abnormality according to whether the normalized value Ze(t) exceeds the normalized value Ze(t−1), at one point in time prior to that of the normalized value Ze(t), a predetermined number m' of times.

Based on the first or third aspect of the invention, the control device for an injection molding machine relevant to a ninth aspect of. the invention includes: a current limiting means for limiting, in the process from the mold tool being open until being closed, the current flowing in the motor when the current reaches a predetermined current limit value; a detection means for detecting, in the process from the mold tool being open until being closed, the value Y(t) of the velocity or position of the motor at multiple points in time synchronized to the closing command signal; a storage means for storing, with the process being repeated A times, respective velocity or position values Y(t) corresponding to each of the points in time; a mean-and-variance calculating means for calculating for each. of the points in time a mean value My(t) and a variance value Vy(t) that correspond to velocity or position values Y(t) that have been read from the storage means; a threshold calculating means for calculating a threshold Yf(t) for each of the points in time using the mean value My(t) and the variance value Vy(t) from an arbitrary number of times up to (A−1) times, according to the following equation:

$$Yf(t)=My(t)-N\cdot\{Vy(t)\}^{1/2}$$

where N is a constant and not less than 3; and a determining means for comparing the threshold Yf(t) and the velocity or position value Y(t) at each of the points in time to determine whether there is an abnormality according to whether the velocity or position value Y(t) is below the threshold Yf(t) a predetermined number m of times.

Based on the first or third aspect of the invention, the control device for an injection molding machine relevant to a tenth aspect of the invention includes: a current limiting means for limiting, in the process from the mold tool being open until being closed, the current flowing in the motor when the current reaches a predetermined current limit value; a detection means for detecting, in the process from the mold tool being open until being closed, the value Y(t) of the velocity or position of the motor at multiple points in time synchronized to the closing command signal; a storage means for storing, with the process being repeated A times, respective velocity or position values Y(t) corresponding to each of the points in time; a mean-and-variance calculating means for calculating for each of the points in time a mean value My(t) and a variance value Vy(t) of velocity or position values Y(t) that have been, read from the storage means; a normalization calculating means for converting the velocity values Y(t) for each of the points in time into normalized values Zy(t) using the mean value My(t) and the variance value Vy(t) from an arbitrary number of times up to (A−1) times, according to the following equation:

$$Zy(t)=\{Y(t)-My(t)\}/\{Vy(t)\}^{1/2};\text{ and}$$

a determining means for, after determining whether the normalized value Zy(t) at each of the points in time is below a predetermined value −N'(N'>2), if the normalized value is below the predetermined value −N', determining whether there is an abnormality according to whether the normalized value Zy(t) is below the normalized value Zy(t−1), at one point in time prior to that of the normalized value Zy(t), a predetermined number m' of times.

The mean-and-variance calculating means in the control device for an injection molding machine relevant to an eleventh aspect of the invention calculates the mean value and the variance value from the current values X(t), the velocity or position values Y(t), or the position deviation values E(t) during the latest K cycles of the mold closing operation.

The mean-and-variance calculating means in the control device for an injection molding machine relevant to a twelfth aspect of the invention calculates the mean value and the variance value from any of the current value X(t), the velocity or position value Y(t), and the position deviation value E(t) during the most recent mold closing operation, and from any pair of the mean value Mx(t) and the variance value Vx(t), the mean value My(t) and the variance value Vy(t), and the mean value Me(t) and the variance value Ve(t) during the previous mold closing operation.

A control device for an injection molding machine relevant to a thirteenth aspect of the invention includes: a storage means for storing a plurality of combinations of the value N and the number m, or the value N' and the number m', a detection sensitivity display means for displaying, based on the combinations of the value N and the number m, or the value N' and the number m', the level of sensitivity in detecting that a foreign object is present within the mold tool; and an adjusting means for adjusting the level based on what is displayed.

A control device for an injection molding machine relevant to a fourteenth aspect of the invention includes a display means for visually displaying the current values X(t) and the current thresholds Yf(t), or the velocity values Y(t) and the velocity or position thresholds Yf(t).

A control device for an injection molding machine relevant to a fifteenth aspect of the invention is characterized in that "at multiple points in time synchronized to the closing command signal . . . the motor" in the first through tenth aspect of the invention is replaced by "at multiple positions based on closing position command signals . . . the motor".

A control device for an injection molding machine relevant to a sixteenth aspect of the invention is characterized in that, based on the first through tenth aspects of the invention, repeating the process A times includes a plurality of repetitions B (B<A) of performing the process with the mold tool in an empty state in which plastic is not poured into the mold tool, and at least one repetition of performing the process with the mold tool in a state in which plastic is poured into the mold tool.

According to the first or second aspect of the invention, the mean values Mx(t) or My(t), and the variance values Vx(t) or Vy(t) are calculated based on the current values X(t) or the velocity or position values Y(t); the current thresholds Xf(t) or the velocity thresholds or the like Yf(t) are automatically calculated based on the mean values Mx(t) or My(t), and the variance values Vx(t) or Vy(t); and, whether a foreign object is present within the mold tool is determined based on the current thresholds Xf(t) or the thresholds Yf(t) for the velocity or the like; whereby there are benefits in that it becomes unnecessary for the operator to designate by trial and error the offset/shift amount for the tolerance range from the mean value in order to determine the thresholds, and that whether a foreign object is present in the mold tool can be precisely determined.

According to the third or fourth aspect of the invention, the mean values Mx(t) or My(t), and the variance values Vx(t) or Vy(t) are calculated based on the current values X(t) or the velocity or position values Y(t); normalized values Zx(t) or Zy(t) are automatically calculated based on the mean values Mx(t) or My(t), and the variance values Vx(t) or Vy(t); and, whether a foreign object is present within the mold tool is determined based on the normalized values Zx(t) or Zy(t); whereby there are benefits in that it becomes unnecessary for the operator to designate as physical values by trial and error the offset/shift amount for the tolerance range from the mean value in order to determine the reference values, and that a foreign object in the mold tool can be precisely detected.

According to the fifth or sixth aspect of the invention, the mean values Me(t) and the variance values Ve(t) are calculated based on the position deviation values E(t); the position deviation thresholds Ef(t) or the normalized values Ze(t) are automatically calculated based on the mean values Me(t) and the variance values Ve(t); and, whether a foreign object is present within the mold tool is determined based on the position deviation thresholds Ef(t) or the normalized values Ze(t); whereby there are benefits in that it becomes unnecessary for the operator to designate as physical values by trial and error the offset/shift amount for the tolerance range from the mean value in order to determine reference values, and that whether a foreign object is present in the mold tool can be precisely determined.

According to the seventh or eighth aspect of the invention, even if the current limiting means is put into operation, the mean values Me(t) and the variance values Ve(t) are calculated based on the position deviation values E(t); the thresholds Ef(t) or the normalized values Ze(t) are automatically calculated based on the mean values Me(t) and the variance values Ve(t); and, whether a foreign object is present within the mold tool is determined based on the thresholds Ef(t) or the normalized values Ze(t); whereby there are benefits in that it becomes unnecessary for the operator to designate by trial and error the offset/shift amount for the tolerance range from the mean value in order to determine the threshold values, and that whether a foreign object is present in the mold tool can be precisely determined.

According to the ninth or tenth aspect of the invention, even if the current limiting means is put into operation, the mean values My(t) and the variance values Vy(t) are calculated based on the velocity or position values Y(t); the thresholds Yf(t) or the normalized values Zy(t) are automatically calculated based on the mean values My(t) and the variance values Vy(t); and, whether a foreign object is present within the mold tool is determined based on the thresholds Yf(t) or the normalized values Zy(t); whereby there are benefits in that it becomes unnecessary for the operator to designate by trial and error the offset/shift amount for the tolerance range from the mean value in order to determine, the threshold values, and that whether a foreign object in the mold tool can be precisely determined.

According to the eleventh aspect of the invention, because the mean and variance values are calculated from the current values X(t) or the velocity or position values Y(t) during the latest K cycles of the mold closing operation, even if the current value X(t) and the velocity or position value Y(t) change due to variation in the ambient temperature, mechanical friction, or the like, the thresholds or the normalized values can be calculated from the current values X(t) or the velocity or position values Y(t) only during the latest K cycles. Therefore, there is a benefit in that the control device is less subject to variations in the ambient temperature, mechanical friction, or the like.

According to the twelfth aspect of the invention, in addition to the benefit from the ninth aspect of the invention, there is another benefit in that the storage capacity of the storage means can be reduced.

According to the thirteenth aspect of the invention, because the control device includes the detection sensitivity display means for displaying, based on combinations of N and m, or N' and m', the level of sensitivity in detecting that a foreign object is present within the mold tool, and the adjusting means for adjusting the level based on what is displayed, there is a benefit in that the operator can easily set the detection sensitivity.

According to the fourteenth aspect of the invention, because the display means visually displays the current values X(t) and the current thresholds Xf(t), or the velocity values Y(t) and the velocity or position thresholds Yf(t), there is a benefit in that the operator can watch the status of detecting foreign objects during the mold closing operation.

According to the fifteenth aspect of the invention, because the determining means determines an abnormality using the values of the current flowing in the motor, the velocity or position values of the motor, or the like, at multiple positions based on the closing position command signals, the benefits as in the first through tenth aspects of the invention can be achieved by using the closing position command signals instead of multiple points in time synchronized to the closing command signal.

According to the sixteenth aspect of the invention, because repeating the process A times includes performing the process in an empty mold state in which plastic is not poured into the mold tool, there is a benefit in that it can be detected at an early stage that a foreign object is stuck within the mold tool when plastic is poured into the mold tool.

BRIEF DESCRIPTION OF DRAWINGS

FIG. 2 is a memory state diagram indicating state of memory that stores detected current values, mean values, and variance values corresponding to each of sampling times according to the first embodiment.

FIG. 4 is a flowchart illustrating the operation of the injection molding machine according to the first embodiment.

BEST MODE FOR CARRYING OUT THE INVENTION

Embodiment 1

An embodiment of the invention will be described using FIG. 1 through FIG. 3.

Figure 1:
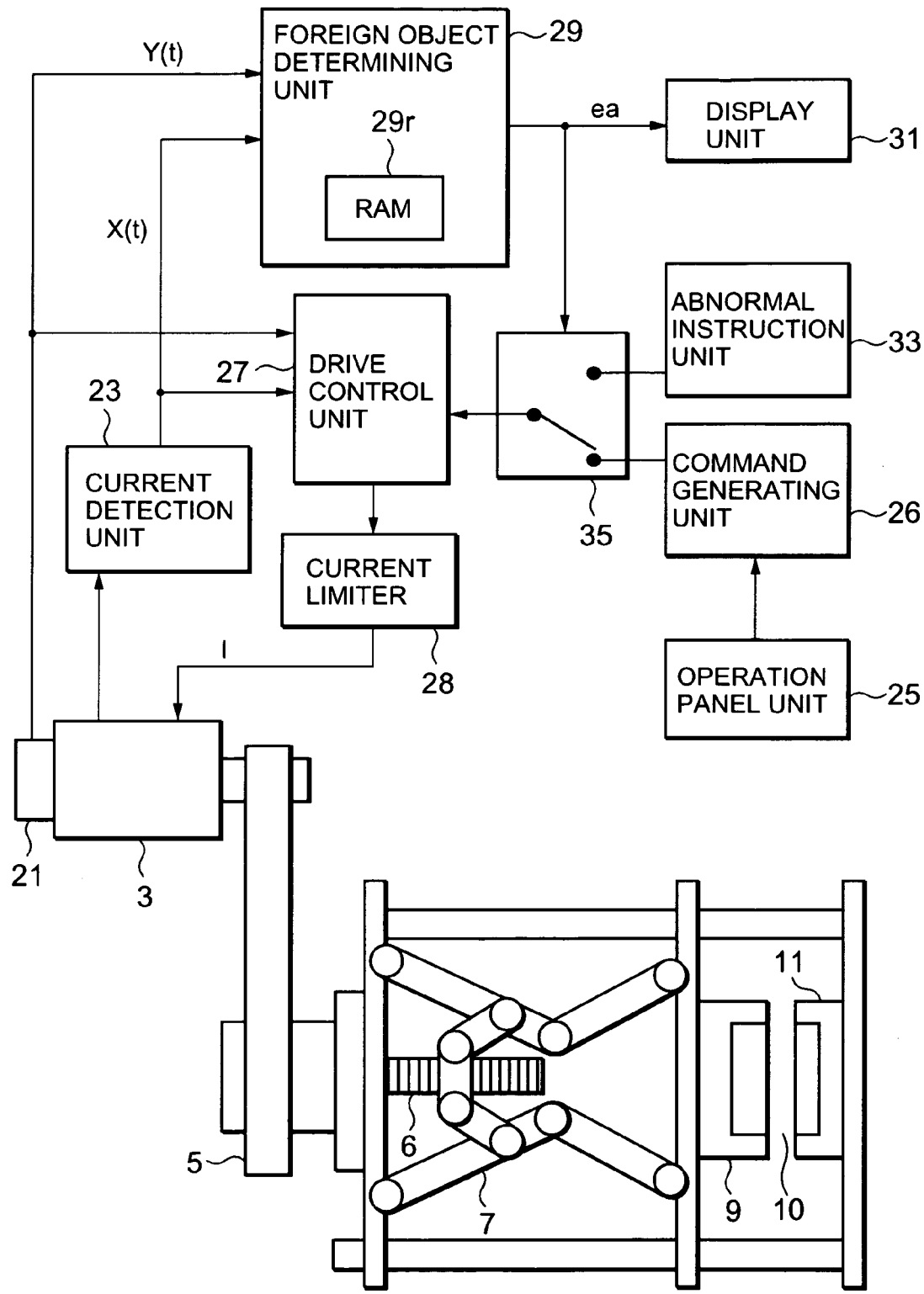
FIG. 1 is a block diagram of a mold closing mechanism and a control device for an injection molding machine according to a first embodiment of the invention.

FIG. 1 is a block diagram of a mold closing operation mechanism and a control device for an injection molding machine; FIG. 2 is a memory state diagram indicating state of memory that stores detected current values, mean values, and variance values corresponding to sampling times; and FIG. 3 includes a diagram (a) illustrating time-current curves and a diagram (b) illustrating time-velocity curves for the injection molding machine.

In FIG. 1, the injection molding machine is configured with a motor 3 that is controlled so that a d-axis current and a q-axis current flow therein, and a timing belt 5 that transmits the rotation of the motor 3 to a rotational shaft that has a ball screw.

The operation mechanism is provided with a toggle mechanism 7 that transforms the rotational movement of the motor 3 into linear movement, with one end portion of the toggle mechanism being stationary and the other end portion being fixed on a movable mold 9; and a fixed mold 11 facing the movable mold 9. The movable mold 9 and the fixed mold 11 constitute a mold tool 10.

The control device includes: an encoder 21 as a detection means for detecting, at a large number of sampling times (point in time and period of time) synchronized to the closing command signal for the mold tool 10, the velocity or the position Y(t) of the motor 3; a current detection circuit 23 as a current detection means for detecting at each of the sampling times the value of a q-axis current X(t) flowing in the motor 3; an operation panel 25 through which an operator inputs mold closing commands, mold opening commands and the like; a command generating unit 26 for creating and generating mold opening/closing command signals for the mold tool 10 based on commands inputted through the operation panel 25; a drive control unit 27 for calculating, from the command signals and the position and the velocity detected by the encoder 21, electrical current commands to be given to the motor 3 and then applying the d-axis current and the q-axis current to the motor 3 based on the electrical current commands; a current limiter 28 as a current limiting means for limiting the current flowing in the motor 3 to a predetermined current when the current exceeds the predetermined current; a foreign object detection determining unit 29 for determining whether a foreign object is present within the mold tool 10 based on the detected current and the detected velocity that have been detected during the closing process for the mold tool 10; a display unit 31 for displaying opening/closing information about the mold tool 10; an abnormal instruction unit 33 for generating an instruction signal that stops the closing operation of the mold tool 10 or opens the mold tool when the foreign object detection determining unit 29 determines during the closing operation of the mold tool 10 that a foreign object is present; and an instruction switching unit 35 for switching the instruction signal from a normal instruction signal to an abnormal instruction signal based on a signal ea that the foreign object detection determining unit 29 outputs.

The foreign object detection determining unit 29 has memory 29r consisting of RAM that stores the detected current values X(t), the detected velocity values Y(t), and the like.

<Foreign Object Detection Determining Unit 29>

A. Detected Current (1). The injection molding machine produces a lot of identical molded products, and includes: the memory 29r as a storage means for respectively storing, with a single-cycle process of closing the mold tool 10 being repeated A times, detected current values X(t) corresponding to each of the sampling times;

(2). a mean-and-variance calculating means for calculating for each of the points in time a mean value Mx(t) and a variance value Vx(t) that correspond to detected current values X(t) that have been read from the memory 29r;

(3). a reference value calculating means for calculating a current threshold Xf(t) for each of the sampling times using the mean current value Mx(t) and the current variance value Vx(t) from an arbitrary number of times up to (A−1) times, according to the following equation:

$$Xf(t)=Mx(t)+N\cdot\{Vx(t)\}^{1/2}$$

where $N \geq 3$; and (4). a determining means for determining whether there is an abnormality, by comparing the current threshold Xf(t) and the detected current value X(t) at each of the points in time, when the number of times the detected current value X(t) is over the current threshold Xf(t) exceeds a predetermined number m.

B. Detected Velocity
(1). The memory 29r for storing, with the above-described process being repeated A times, respective velocity values Y(t) corresponding to each of the above-described points in time;
(2). a mean-and-variance calculating means for calculating for each of the points in time a mean value My(t) and a variance value Vy(t) that correspond to velocity values Y(t) that have been read from the memory 29r;
(3). a reference value calculating means for calculating velocity thresholds Yf(t) for each of the sampling times using the mean velocity values My(t) and the velocity variance values Vy(t) from an arbitrary number of times up to (A−1) times, according to the following equation:

$$Yf(t)=My(t)-N\cdot\{Vy(t)\}^{1/2}$$

where N≧3; and
(4). a determining means for determining whether there is an abnormality, by comparing the velocity threshold Yf(t) and the velocity value Y(t) at each of the points in time, when the number of times the velocity value Y(t) is over the velocity threshold Yf(t) exceeds a predetermined number m are provided.

<Memory>

The storage structure of the memory 29r will be described using FIG. 2. Each line in FIG. 2(a) requires T sampling data values for each mold closing operation, and stores the detected current values X(t) for each of the sampling times; and each row stores the detected current values X(t) for K cycles at each sampling time. The detected current value xi(t) indicates the data for the i-th line during the mold closing operation. The detected current values for the newer mold closing process are stored in the order line p, line (p−1), line (p−2), . . . , line 1, line 0, line (K−1), . . . , and line (p+1). Each time a mold closing operation is completed normally, a ring buffering operation by which the latest data overwrites the oldest data line is executed. A pointer p in FIG. 2(b) stores the line indicating the latest detected current values in FIG. 2(a). As in FIG. 2(c), the mean current values Mx(t) and the current variance values Vx(t) at each sampling time, and the sums Sx(t) of the current and the sums Ux(t) of squares of the current, which have been calculated according to the following equations, are stored.

$$Sx(t)=\sum_{i=0}^{K-1} xi(t) \quad Ux(t)=\sum_{i=0}^{K-1}\{x_i(t)\}^2$$

The description above has been made for the current, and meanwhile, mean velocity values My(t), velocity variance values Vy(t), the sums Sy(t) of the velocity, and the sums Uy(t) of squares of the velocity are stored.

$$Sy(t)=\sum_{i=0}^{K-1} yi(t) \quad Uy(t)=\sum_{i=0}^{K-1}\{y_i(t)\}^2$$

Here, the detected velocity value yi(t) indicates the data for the i-th line during the mold closing operation.

<Current Threshold and Velocity Threshold>

Figure 3A:
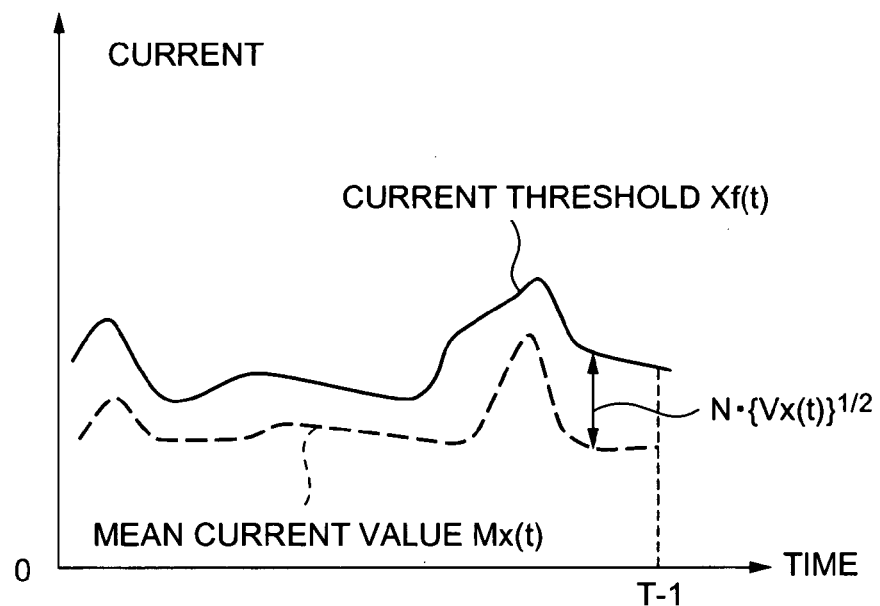
FIGS. 3a and 3b show a diadram (a) having time-current curves and a diagram (b) illustrating time-velocity curves for the injection molding machine according to the first embodiment.

The setting of the current thresholds and the velocity thresholds will be described using FIG. 3. FIG. 3 includes a diagram (a) illustrating time-current curves and a diagram (b) illustrating time-velocity curves, which describe the setting of the thresholds. FIG. 3(a) illustrates a relationship among mean current values Mx(t), current thresholds Xf(t), and N·(current variance values)$^{1/2}$=N·$\{Vx(t)\}^{1/2}$ where, during the time T−1 from starting the mold closing operation at the time t=0 to completion, the detection timing of the current to be detected is determined according to the constant-period sampling time generated by dividing the time T−1 into many segments. Here, T−1 indicates the mold closing operation completion time.

The shorter the sampling time period is, the better the detection precision. However, if the sampling time is too short, the limits of the computational capabilities of the foreign object detection determining unit 29 and the storage capacity of the memory 29r storing the detected current become problematic; accordingly, an appropriate sampling period is around 100 μsec to 10 msec. And, when a foreign object is stuck in the mold tool 10, the current is increasingly applied to the motor 3; so the current thresholds are set in a direction increasing from the mean values. Whether a malfunction is present is determined using the number of times when the detected current exceeds the current threshold.

Figure 3B:
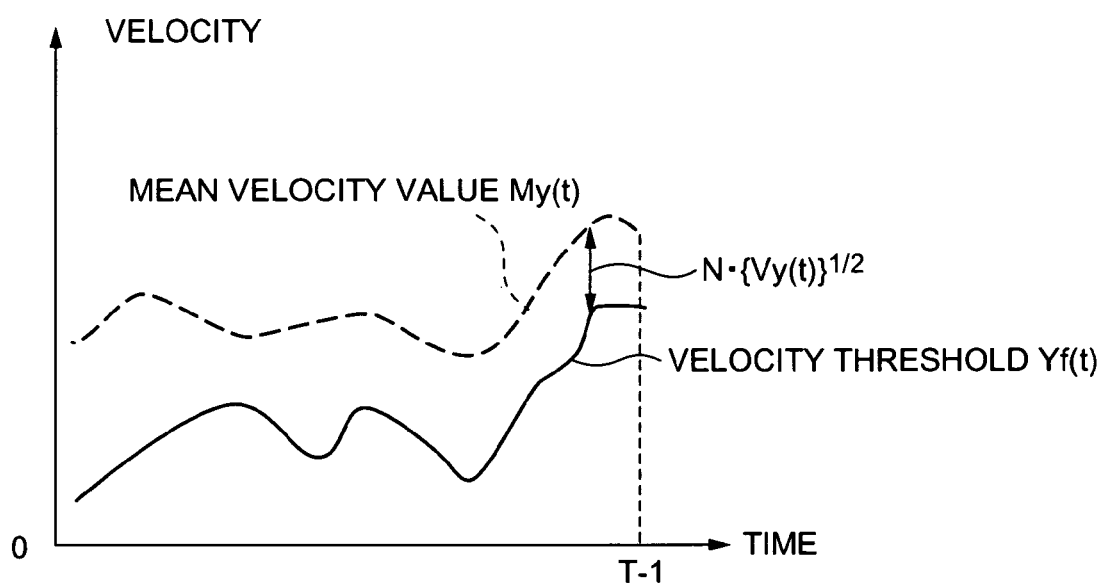

FIG. 3(b) illustrates a relationship among mean velocity values My(t), velocity thresholds Yf(t), and N·(velocity variance values)$^{1/2}$=N·$\{Vy(t)\}^{1/2}$; and the velocity to be detected is sampled according to sampling period during the time T−1 from starting the mold closing operation at the time t=0 to completion. Moreover, when a foreign object is stuck in the mold tool 10, the foreign object blocks the movement of the motor 3, and the velocity of the motor 3 is lower than the normal value; so the velocity thresholds are set in a direction decreasing from the mean velocity values. Whether a malfunction is present is determined using the number of times when the detected velocity underruns the velocity reference value.

<Operation of the Control Device for the Injection Molding Machine>

The operation of the control device for the injection molding machine of the embodiment of the invention will be described using FIG. 1 through FIG. 4. Firstly, in the state where plastic is not poured into the mold tool 10 (hereinafter, referred to as an empty mold), an operator inputs a mold opening/closing instruction signal to the operation panel 25; and the command generating unit 26 generates opening/closing command signals and inputs them via the command switching unit 35 to the drive control unit 27. The drive control unit 27 applies the current to the motor 3 based on the opening/closing command signals, and drives the motor 3 by feedback control based on the detected position value and the detected velocity value, of the motor 3, which have been detected by the encoder 21, and the detected current value that has been detected by the current detection device 23. The rotational movement of the motor 3 is transformed by the toggle mechanism 7 via the timing belt 5 into linear movement, which opens and closes the empty mold tool several times to update the thresholds (step S101). Step S101 is provided here in order to determine the presence of a foreign object at an early stage after the start of the mold closing operation of the mold tool 10 into which plastic has been poured. The details of the step S101 will be described using the flowchart of FIG. 5. The parameter for indicating time is set to t=0 (step S11). The malfunction detection determining unit 29 detects the current value detected and the velocity value detected at each sampling time during the empty molding operation, and stores them in the memory 29r (step S15). Whether the mold closing operation has been completed is checked (step S21); if it has not been completed, t=t+1 is executed (step S23), and then step S15 is executed again.

Meanwhile, if the mold closing operation has been completed in step S21, the malfunction detection determining unit 29 updates the mean current values Mx(t), the current variance values Vx(t), the mean velocity values My(t), and the velocity variance values Vy(t) (step S27) using the detected current values and the detected velocity values in the latest mold closing operation stored in the memory 29r; updates the current threshold Xf(t) and the velocity threshold Yf(t) for each of the sampling times (step S29); and checks whether the predetermined number of repetitions of the mold closing operation in the empty mold state have been completed (step S31). If the predetermined repetitions of the mold closing operation in the empty mold state have been executed, step S101 is completed. If the predetermined repetitions of the mold closing operation in the empty mold state have not been executed here, the steps S11 through S31 are executed.

Next, in order to produce a desired molded object, a molding cycle in which plastic is poured into the mold tool 10 is started, and the parameter for indicating time is set to t=0 (step S103). The malfunction detection determining unit 29 detects the current value to be detected and the velocity value to be detected at each sampling time by the current detection circuit 23 and the encoder 21, respectively, in the process for the opening and closing operation of the mold tool 10, and stores them in the memory 29r (step S105). Thus, with the process for the opening and closing operation of the mold tool 10 being repeated A times, the detected current values and the detected velocity values corresponding to each of the sampling times have been stored in the memory 29r. Here, the above "A times" means the sum of the number of times of closing the empty mold in the early stage in step S31 in FIG. 5 and the number of times of opening and closing the mold tool 10 into which plastic has been poured. The malfunction detection determining unit 29 calculates as described above the current thresholds Xf(t) in the mold closing operation up to (A−1) times, and determines whether there is an abnormality or not by comparing the detected current value X(t) and the current threshold Xf(t) at each of the sampling times (step S107).

Figure 6:
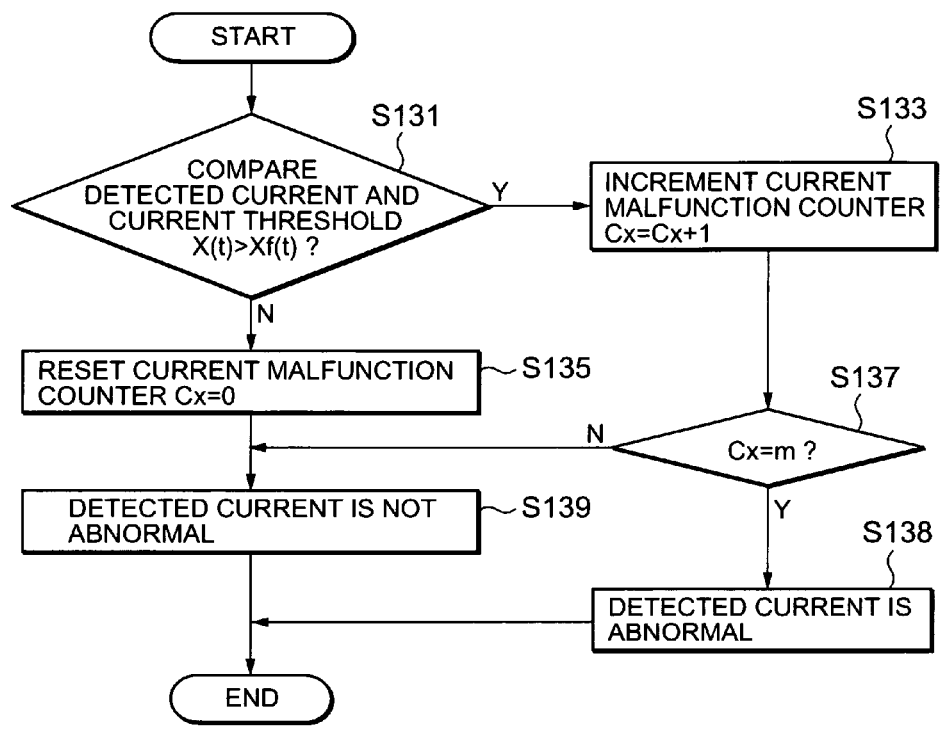
FIG. 6 is a flowchart illustrating the detailed operation of step S107 in FIG. 4.

FIG. 6 is a diagram illustrating in detail step S107 in FIG. 4. Whether the detected current value X(t) exceeds the current threshold Xf(t) is determined by comparing the detected current value X(t) and the current threshold Xf(t) at the same sampling time (step S131). If the detected current value exceeds the current threshold, a current malfunction counter Cx is incremented by 1 (step S133). The foreign object detection determining unit 29 determines whether the current malfunction counter has reached a predetermined count m (step S137). If it has reached the count m, the detected current is determined to be abnormal, and an abnormal signal is generated (step S138).

The abnormal signal ea is inputted to the display unit 31, and the display unit 31 indicates using characters or the like that a malfunction has arisen in the mold tool 10. At the same time, the abnormal signal ea is inputted to the instruction switching unit 35, and the switch is flipped upward to select the instruction from the abnormal instruction unit 33. The abnormal instruction unit 33 generates a stop command for the mold tool 10, and inputs the stop command signal via the instruction switching unit 35 to the drive control unit 27. The drive control unit 27 stops applying the voltage to the motor 3. Consequently, the operation of the movable mold 9 is stopped immediately on detecting a foreign object having been stuck in the mold tool 10 (step S109).

Meanwhile, if the detected current does not exceed the current threshold in step S131, the current malfunction counter Cx is reset to 0 (step S135), and the detected current is determined to be not abnormal (step S139). In step 137, if the current malfunction counter has not reached m, the detected current is likewise determined to be not abnormal (step S139).

Specifically, if the detected current has exceeded the current threshold at m consecutive sampling times, the detected current is determined to be abnormal. This can prevent the mold tool 10 from being damaged due to a foreign object being stuck.

In addition, in the above-described embodiment, the movable mold 9 is stopped by the abnormal signal ea, but the movable mold 9 may instead be reversed.

Next, the malfunction detection determining unit 29 calculates as described above the current thresholds Yf(t) in the mold closing operation up to (A−1) times, and determines whether there is an abnormality or not by comparing the detected velocity value Y(t) and the velocity threshold Yf(t) at each of the sampling times (step S111).

Figure 7:
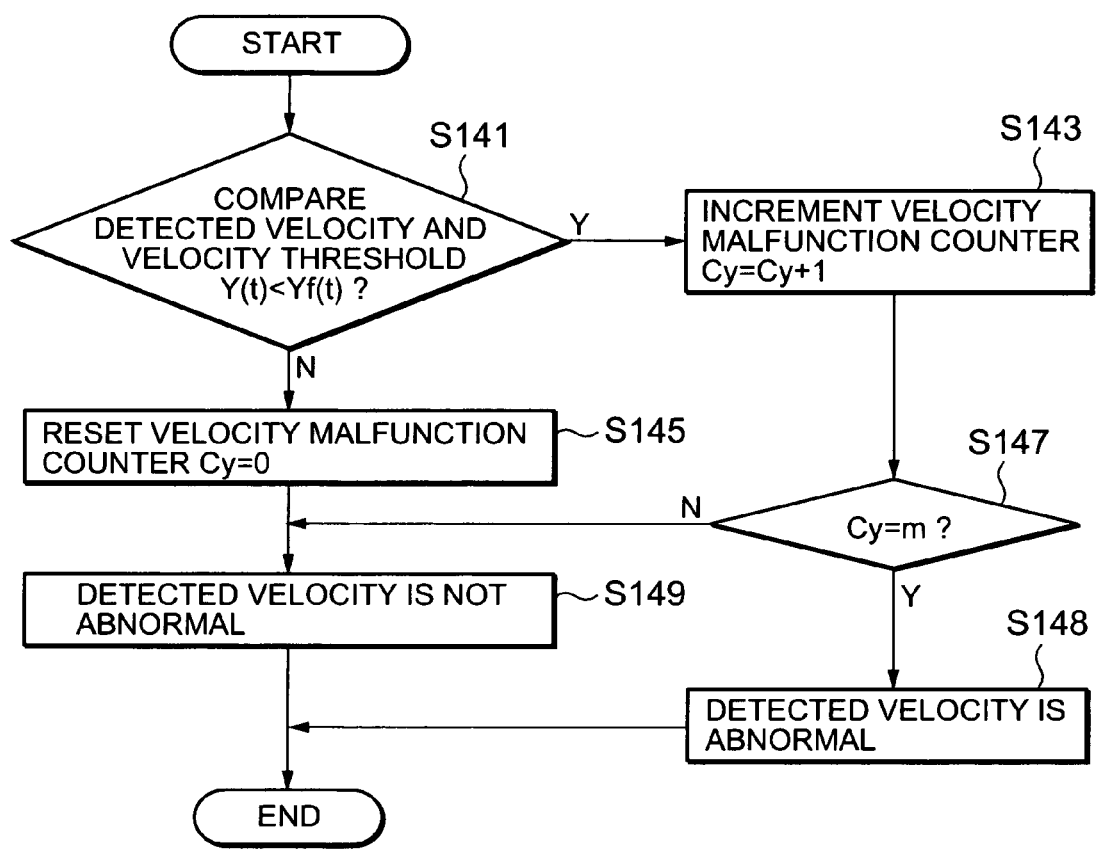
FIG. 7 is a flowchart illustrating the detailed operation of step S111 in FIG. 4.

FIG. 7 is a diagram illustrating in detail step S111 in FIG. 4. Whether the detected velocity value is lower than the velocity threshold is determined by comparing the detected velocity value Y(t) and the velocity threshold Yf(t) at the same sampling time (step S141). If the detected velocity value is lower, the velocity malfunction counter Cy is incremented by 1 (step S143). If a foreign object is stuck in the mold tool 10, the velocity of the motor 3 becomes lower; so when the detected velocity value is lower than the velocity threshold, it is determined to be abnormal.

Whether the velocity malfunction counter Cy has reached the predetermined count m is determined (step S147). If it has reached the count m, the detected velocity is determined to be abnormal, and an abnormal signal is generated (step S148). Based on the abnormal signal ea, a process for an abnormality as in the above-described step 109 is executed (step S113).

Meanwhile, if the velocity threshold is higher than the detected velocity value in step S141, the velocity malfunction counter Cy is reset to 0 (step S145), and the detected velocity is determined to be not abnormal (step S149). In step S147, if the velocity malfunction counter has not reached m, the detected velocity is likewise determined to be not abnormal (step S149).

Specifically, if the detected velocity is lower than the velocity threshold at m consecutive sampling times, the detected velocity is determined to be abnormal.

In step S111, if a malfunction is not present, whether the mold closing operation has been completed is checked (step S115); if the mold closing operation has not been completed, the sampling time is incremented by 1 (step S123); and the steps S105 through S115 are executed again.

Meanwhile, if the mold closing operation has been completed in step S115, the detected current values and the detected velocity values in the latest mold closing operation are read from the memory 29r; and the mean current value Mx(t), the current variance value Vx(t), the mean velocity value My(t), and the velocity variance value Vy(t) for each of the sampling times are updated (step S117). Using the mean current value, the current variance value, the mean velocity value, and the velocity variance value that have been updated as just noted, and a predetermined value N, the current threshold Xf(t) and the velocity threshold Yf(t) for each of the sampling times are calculated according to the following equations (step S119).

$$Xf(t)=Mx(t)+Nx(Vx(t))^{1/2}$$

$$Yf(t)=My(t)-Nx(Vy(t))^{1/2}$$

where a value not smaller than 3 is used for N; preferably, 3<N<10. This is because it was confirmed by experiment that false operation occurs when N is smaller than 3.

The foreign object detection determining unit 29 determines whether a desired number of the molding cycles has been reached (step S121). If it has not been reached, the steps S103 through S119 are executed. Meanwhile, if it has been reached, the processing is terminated.

Furthermore, the current and the velocity that have positive values have been described; however, when the current value X(t) and the velocity value Y(t) are negative values, the thresholds are designated as in the following equations:

$$Xf(t)=Mx(t)-Nx(Vx(t))^{1/2}$$

$$Yf(t)=My(t)+Nx(Vy(t))^{1/2}$$

Moreover, in the above-described steps S131 or S141, if the detected current value or the detected velocity value has a negative value, whether "X(t)<Xf(t)" or "Y(t)>Yf(t)", respectively, is to be checked.

As described above, the mean values Mx(t) or My(t), and the variance values Vx(t) or Vy(t) are calculated based on the current values X(t) or the velocity values Y(t); the current thresholds Xf(t) or the velocity thresholds Yf(t) are automatically calculated based on the mean values Mx(t) or My(t), and the variance values Vx(t) or Vy(t); and, whether a foreign object is present in the mold tool 10 is determined based on the current thresholds Xf(t) or the velocity thresholds Yf(t); whereby it becomes unnecessary for the operator to designate by trial and error the offset/shift amount for the tolerance range from the mean value in order to determine the thresholds, and whether a foreign object is present in the mold tool can be precisely determined.

When a mold closing operation is executed in particular for a complicated-structure mold tool such as a mold tool with a slide core, the variance of the current or the velocity at each time t is sometimes large and sometimes small. According to the embodiment, at a point in time when the variance of the current or the velocity is large, because the variance Vx(t) or Vy(t) is a large value, there is a tendency for the threshold to become larger. Owing to this tendency, there is a benefit in that the erroneous detection that a foreign object is present even in a normal state can be prevented by dulling the sensitivity at a large-variance point in time. Meanwhile, because at a point in time when the variance is small, the variance Vx(t) or Vy(t) is a small value, there is a tendency for the threshold to become smaller. Owing to this tendency, there is a benefit in that a foreign object can be precisely detected by sharpening the sensitivity at a small-variance point in time.

Furthermore, even if the data variance varies as the mold closing operation is repeated, Vx(t) or Vy(t) characteristically varies in accordance with the variation in the data variance, and there is a benefit in that appropriate thresholds can be designated.

Moreover, generally, the drive control unit 27 introduces a feedback control that compares the instruction signal and the detected present value, and that outputs the current in accordance with that difference; whereby, even if a foreign object is stuck in the mold tool, the drive control unit tries to enlarge the current flow so as to follow the instruction as long as there is capacity to generate the current. For this reason, there is a tendency that, when a foreign object is trapped, a malfunction often manifests itself firstly in the current, and next in the velocity, the position, or the position deviation. However, when the limit value for the current limiter 28 in the control device is small, and the current limiter 28 is put into operation, a malfunction is not likely to manifest itself in the detected current even if a foreign object is stuck in the mold tool; whereby the precision in determining a foreign object malfunction by the current detection decreases. Given such circumstances, even if the current flowing in the motor 3 increases, putting the current limiter 28 into operation, the foreign object determining unit 29 makes a determination based on the abnormal velocity value Y(t), whereby the foreign object determination can be precisely performed.

In the above-described embodiment, the foreign object determination is performed using both the current data and the velocity data; however, in cases where the current limit value is large or the memory capacity is limited, only either the current or the velocity may be used to determine whether a foreign object is present.

Moreover, in step S107 in the above-described embodiment, the foreign object detection determining unit 29 calculates the current thresholds Xf(t) in the mold closing operation up to (A−1) times; however, this may be an arbitrary number of times up to (A−1) times, more specifically, (A−2) times or (A−3) times.

Embodiment 2

Even in the detected current values or the detected velocity values during the mold closing process according to identical mold closing command signals, global variations, which are minute but gradually increase or decrease at all sampling times, sometimes arise in the detected current values or the detected velocity values due to the ambient temperature, mechanical friction, or the like, other than the detected value variations in repeating the mold closing operation. Accordingly, determination of an abnormality can be performed more appropriately using the thresholds calculated from the mean and variance values of the detected current values and the detected velocity values only in the latest several cycles than using the thresholds calculated from the mean and variance values for each of the sampling times based on all the detected values from immediately after starting the mold opening/closing cycles up to the most recent cycle.

A mean-and-variance calculating means for the malfunction detection determining unit 29 in another embodiment of the invention in which such a phenomenon is considered will be described according to the flowchart of FIG. 8.

Figure 5:
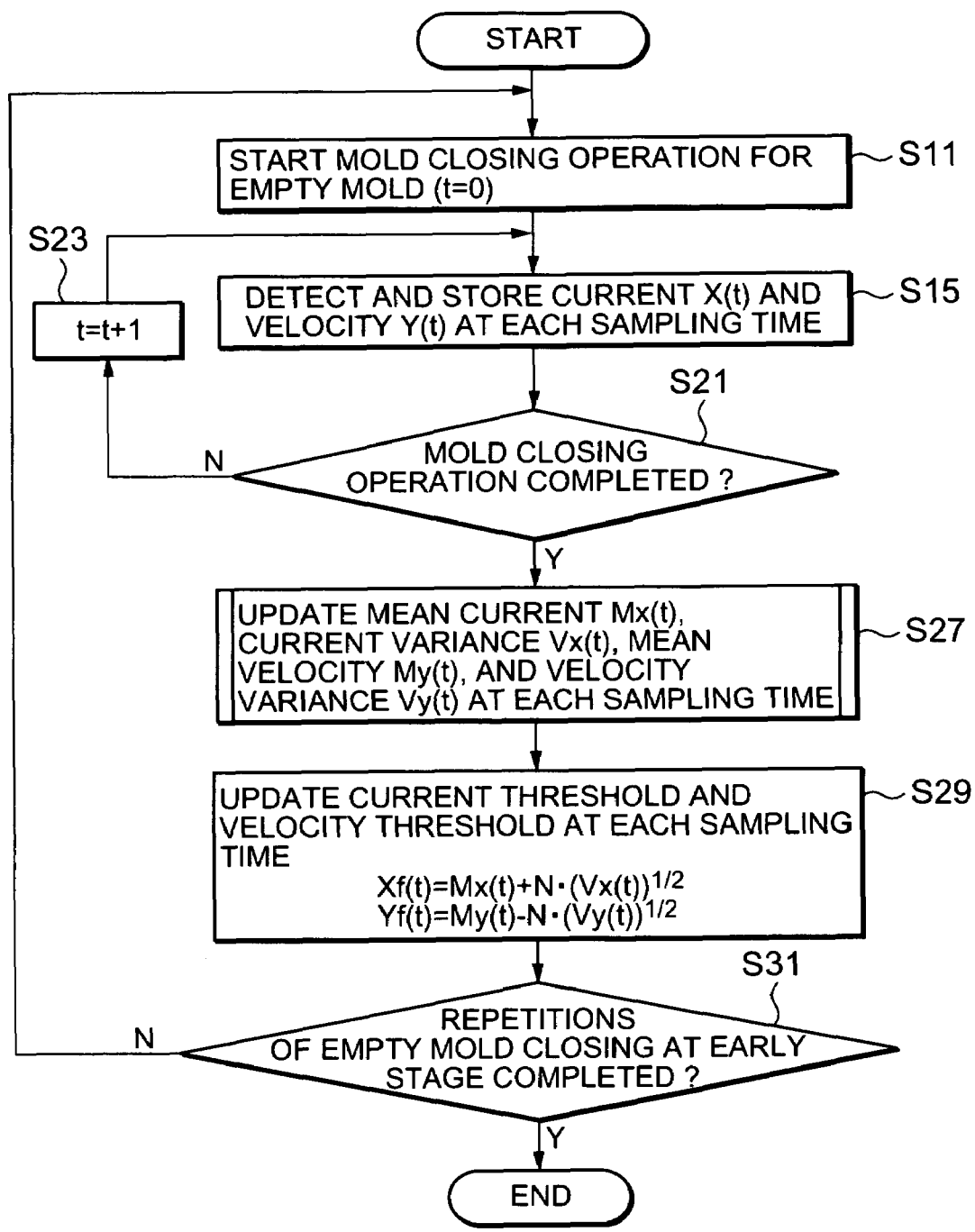
FIG. 5 is a detailed flowchart illustrating the updating of thresholds during the mold closing operation with the mold tool in an empty state illustrated in FIG. 4.
Figure 8:
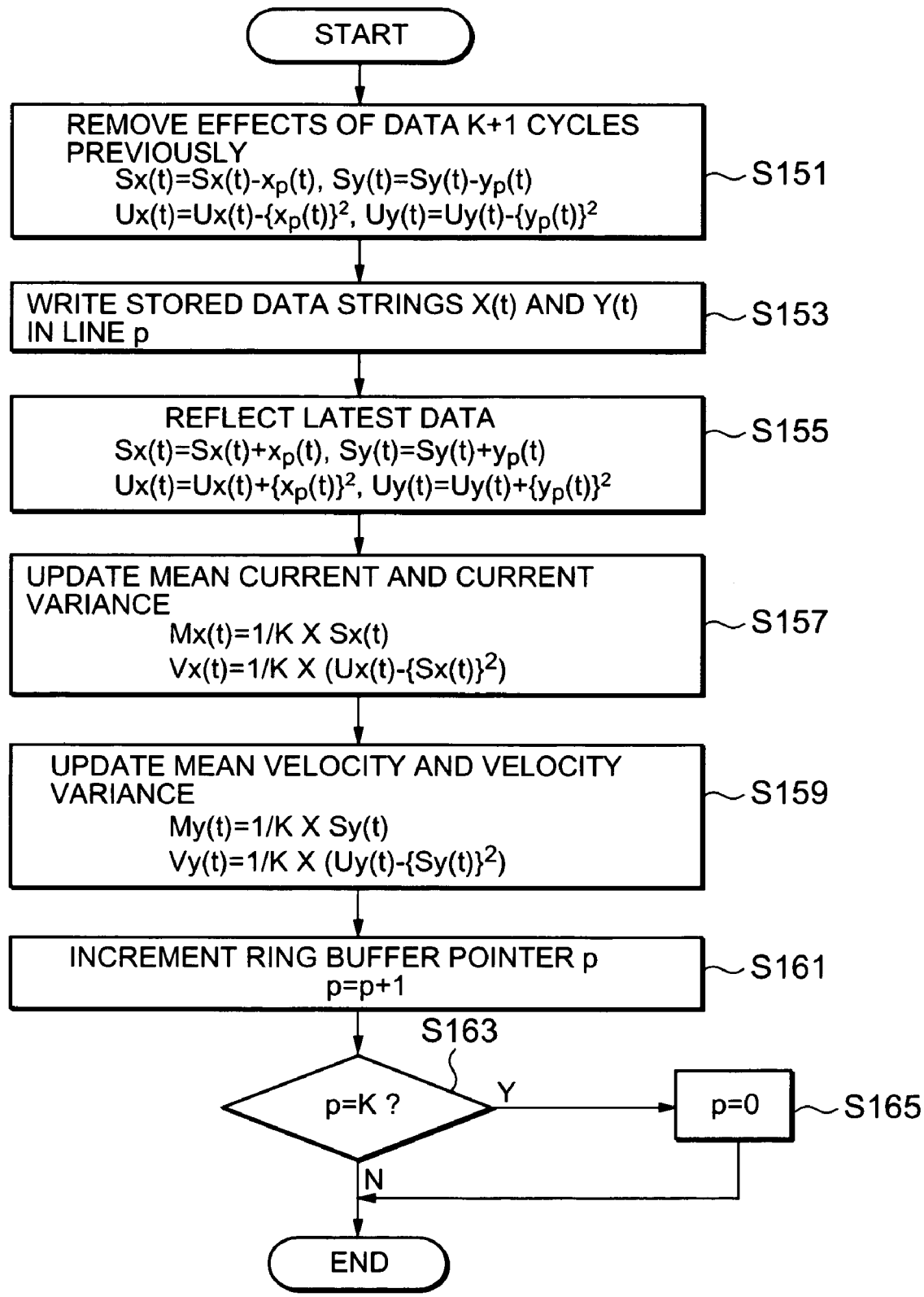
FIG. 8 is a flowchart illustrating a procedure for updating mean values and variance values according to a second embodiment.

FIG. 8 corresponds to the calculation and updating, from the detected current values and the detected velocity values, of the mean current values, the current variance values, the mean velocity values, and the velocity variance values for each of the sampling times in the above-described step S117 in FIG. 4 and the above-described step S27 in FIG. 5.

The malfunction detection determining unit 29 removes the effects of the values detected K+1 times before from the sum Sx(t) of the current, the sum Ux(t) of squares of the current, the sum Sy(t) of the velocity, and the sum Uy(t) of squares of the velocity (step S151). The time-series detection values of the most recent normally completed mold closing operation are written in the line p, which indicates the newest line, in the memory 29r (step S153). In order to reflect the effects of the detected values in the sum Sx(t) of the current, the sum Ux(t) of squares of the current, the sum Sy(t) of the velocity, and the sum Uy(t) of squares of the velocity that have been written as above, the computation illustrated in FIG. 8 is performed (step S155); and the mean current value Mx(t) and the current variance value Vx(t) are calculated from the sum Sx(t) of the current and the sum Ux(t) of squares of the current according to the following equations (step S157).

$$Mx(t) = \frac{1}{K}\sum_{i=0}^{K-1} x_i(t) = \frac{1}{K}Sx(t)$$

$$Vx(t) = \frac{1}{K}\sum_{i=0}^{K-1} (x_i(t) - Mx(t))^2$$

$$= \frac{1}{K}\sum_{i=0}^{K-1} \{x_i(t)\}^2 - \frac{1}{K}\left(\sum_{i=0}^{K-1} x_i(t)\right)^2$$

$$= \frac{1}{K}(Ux(t) - \{Sx(t)\}^2)$$

The mean velocity value My(t) and the velocity variance value Vy(t) for each of the sampling times are calculated in the same way (step S159). The pointer for indicating the latest line is incremented (step S161); a check is made as to whether the pointer p equals K (step S163); and if the pointer equals K, the pointer p is reset to 0 (step S165).

Moreover, when the combination of the present embodiment and the Embodiment 1 is carried out, the mold closing operation must be repeated at least K times in the initial stage.

Embodiment 3

There is a tendency that, when a foreign object is stuck in the mold tool 10, both the current flowing in the motor 3 and the velocity of the motor 3 increasingly depart from the mean values as time passes. The velocity of the motor 3 gradually decreases because the mold tool 10 is prevented from moving forward by the foreign object that is stuck. In addition, when the foreign object is stuck in the mold tool 10, the current flowing in the motor 3 increases so as to follow the instruction of the drive control unit 27 because the closing operation for the mold tool 10 is performed by feedback control.

An embodiment of the invention in which a foreign object is detected assuredly at an early stage using the above-described phenomenon will be described according to the flowchart of FIG. 9. Symbols in FIG. 9 that are identical to those in FIG. 4 indicate the corresponding identical steps; and their descriptions will be omitted.

Figure 9:
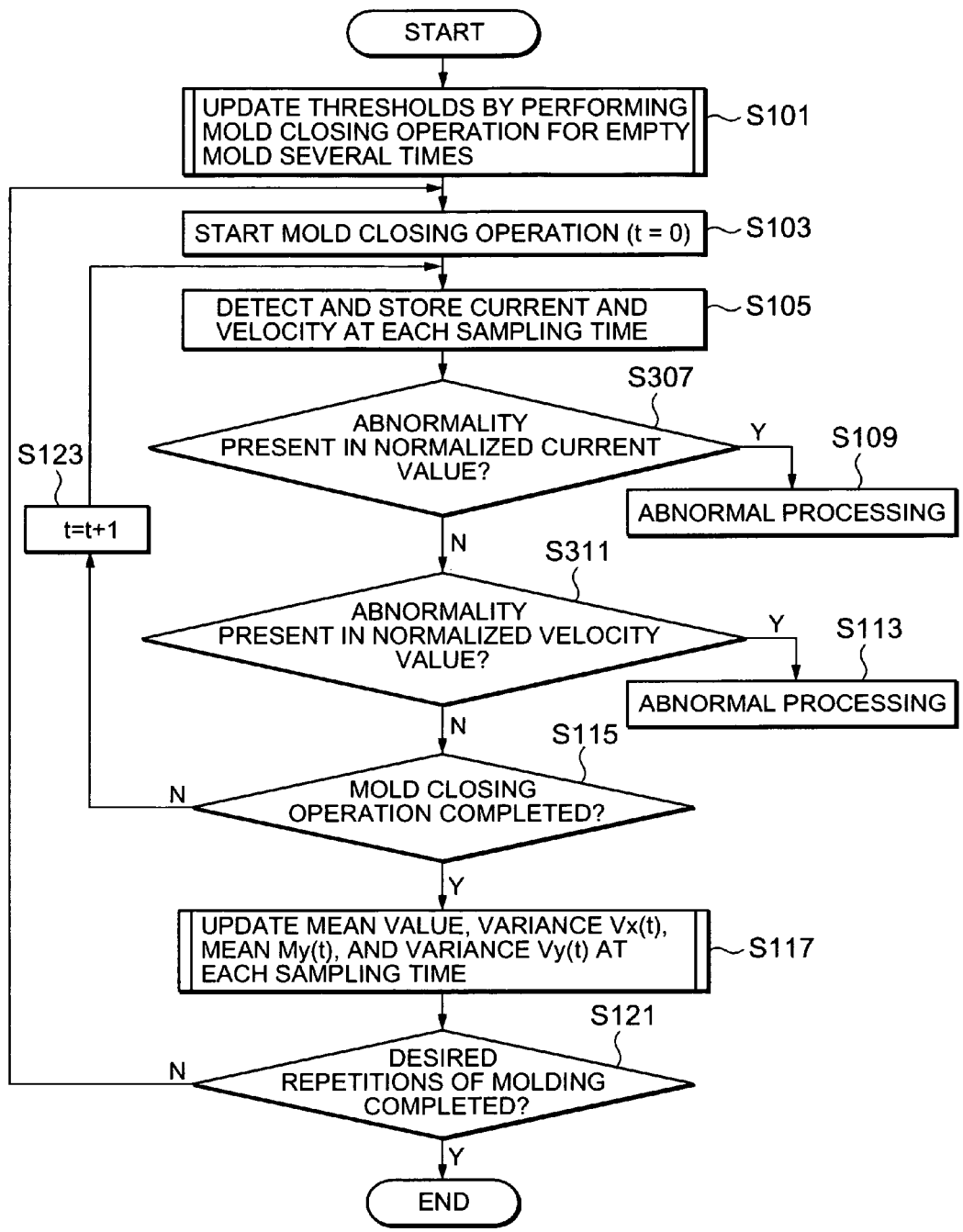
FIG. 9 is a flowchart illustrating the operation of the injection molding machine according to a third embodiment.

In FIG. 9, the steps S107 and S111 in FIG. 4 are replaced with steps S307 and S311, respectively, and additionally, the step S119 in FIG. 4 is eliminated.

Figure 10:
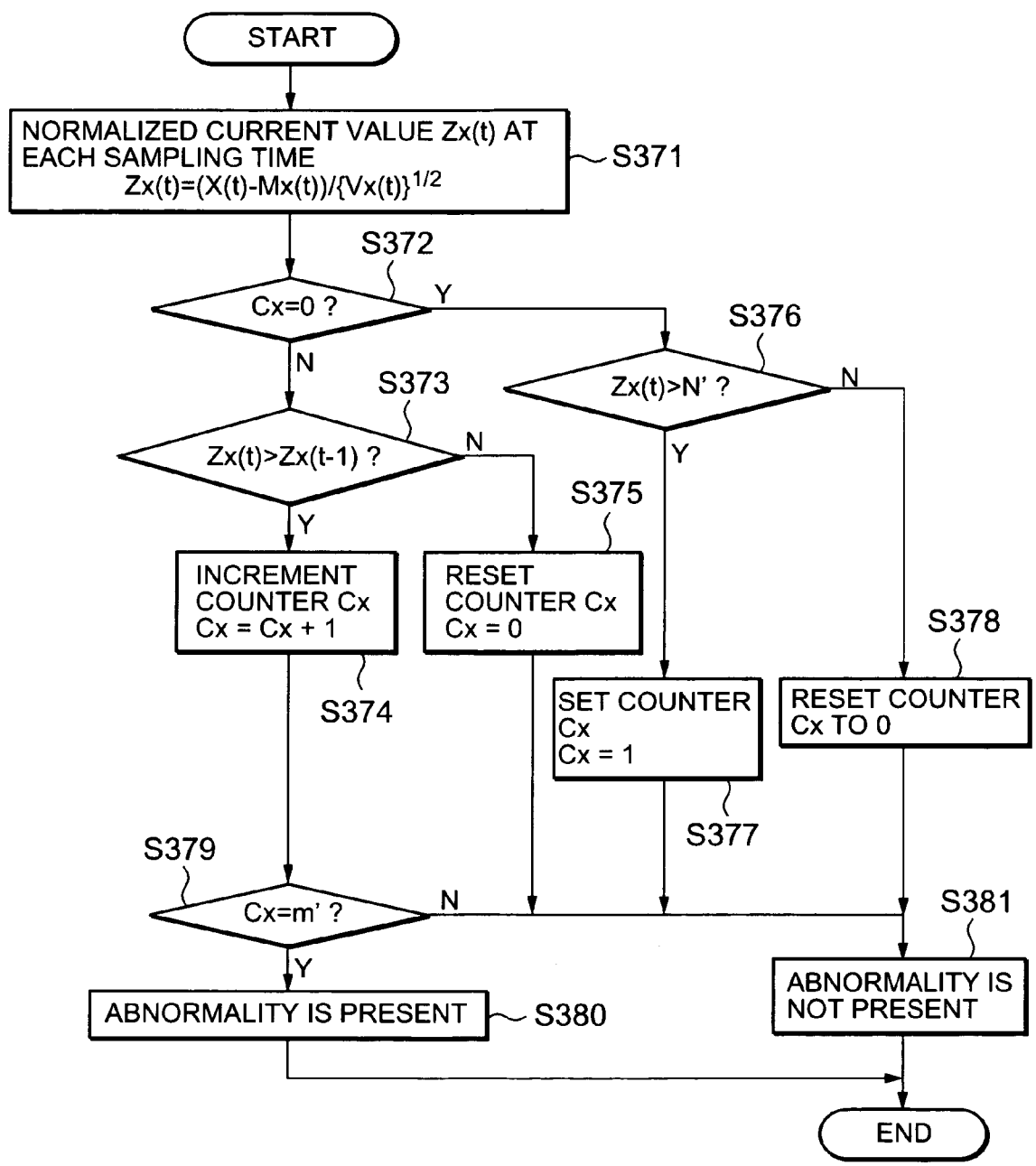
FIG. 10 is a flowchart illustrating the detailed operation of step S307 in FIG. 9.

FIG. 10 is a flowchart illustrating details of step S307 in FIG. 9. The malfunction detection determining unit 29 calculates a normalized current value from the mean value and the variance value at each sampling time (step S371). More specifically, the normalized current value Zx(t) is calculated from the detected current value X(t), the mean current value Mx(t), and the current variance value Vx(t) according to the following equation.

$$Zx(t) = \{X(t) - Mx(t)\}/\{Vx(t)\}^{1/2}$$

Figure 12A:
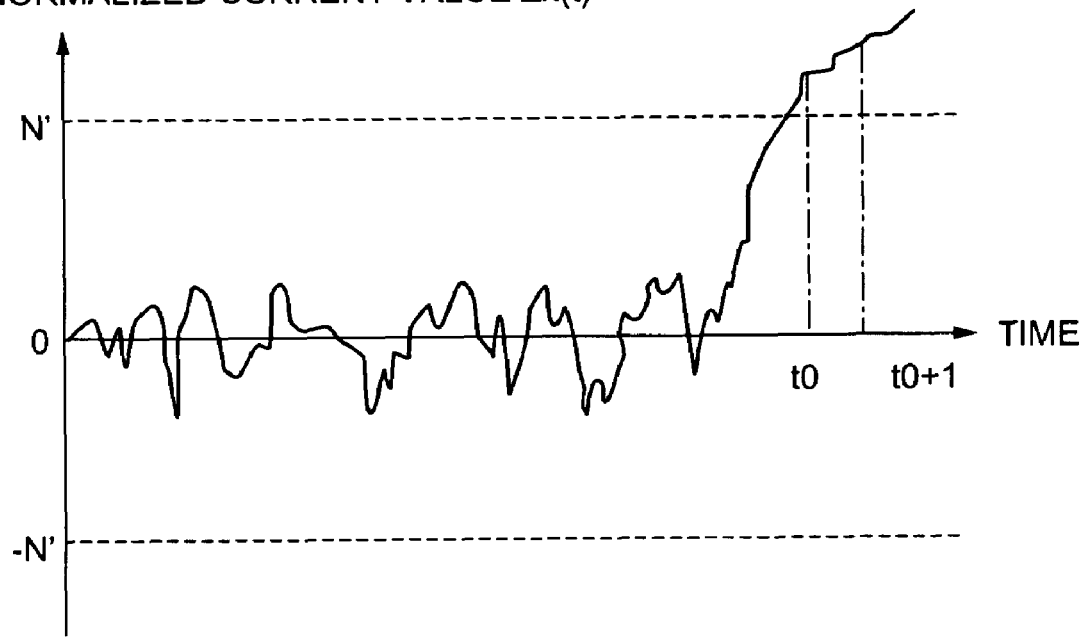
FIG. 12 includes a diagram (a) illustrating time-normalized current values and a diagram (b) illustrating time-normalized velocity values for the injection molding machine according to the third embodiment.

The normalized current value Zx(t) is an indicator that indicates displacement from the mean value of the detected current values; the closer to 0 the normalized current value is, the closer to the mean value; and the further from 0 the normalized current value is, the larger the displacement from the mean value. This will be described using FIG. 12, which illustrates time vs. normalized current value, and time vs. normalized velocity value. According to FIG. 12(a), when a foreign object starts to get stuck at around the time t0, the normalized current value increases as time passes, and then the normalized current value exceeds a predetermined value N'.

The malfunction detection determining unit 29 determines whether the current malfunction counter Cx is 0 (step S372) to check if the normalized current value has exceeded the initial threshold value N' at the previous sampling time. If the current malfunction counter Cx is 0, the normalized current value Zx(t) and the predetermined initial threshold value N' are compared (step S376). Here, N'>2; more preferably, 2.5<N'<8. The lower limit of N' is derived from the fact that N' is a little smaller than N described in Embodiment 1.

If the normalized current value does not exceed the initial threshold value N', the malfunction detection determining unit 29 resets the current malfunction counter Cx to 0 (step S378). Meanwhile, if the normalized current value exceeds the initial threshold value, the current malfunction counter Cx is set to 1 (step S377), and it is determined that an abnormality is not present in the detected current (step S381). Meanwhile, if the current malfunction counter Cx is not 0 in step S372, the normalized current value Zx(t−1) for the previous sampling time and the normalized current value Zx(t) for the present sampling time are compared (step S373). The reason why the normalized current value Zx(t) and the normalized current value Zx(t−1) are compared here is to detect at an early stage such a phenomenon that, as described above, when a foreign object is stuck in the mold tool 10, the current flowing in the motor 3 increasingly departs from the mean value as time passes.

The malfunction detection determining unit 29 increments the current malfunction counter by 1 if the normalized current value Zx(t) for the present time is larger; and then, if the current malfunction counter reaches a predetermined count m', the malfunction detection determining unit 29 determines that there is an abnormality because a foreign object is stuck in the mold tool 10 (step S379). Here, m'>3.

In step S373, if the normalized current value Zx(t−1) for the previous time is larger than the normalized current value Zx(t) for the present time, the current malfunction counter is reset to 0 (step S375).

Figure 11:
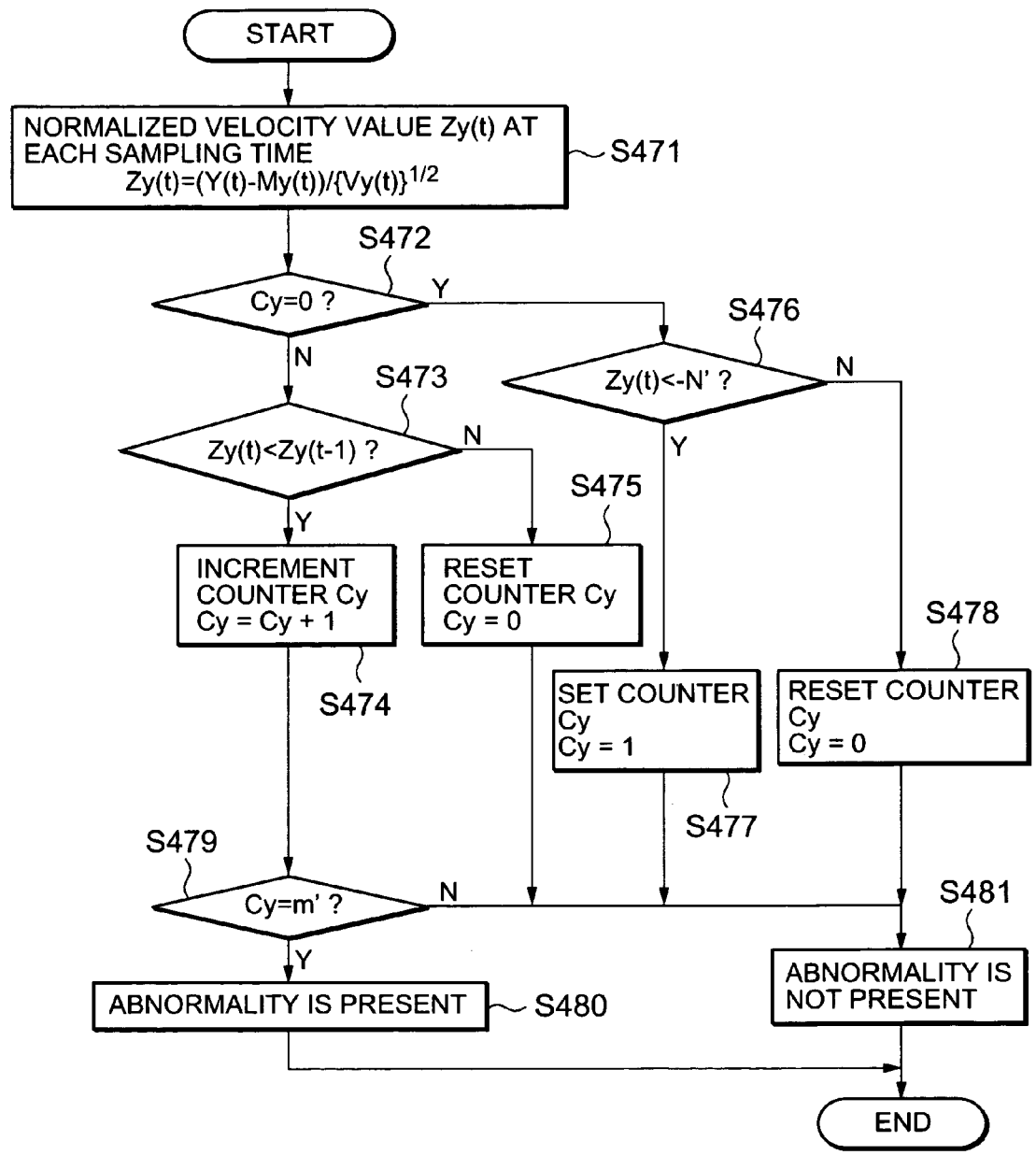
FIG. 11 is a flowchart illustrating the detailed operation of step S311 in FIG. 9.

FIG. 11 is a flowchart illustrating details of step S311 in FIG. 9. Detailed descriptions will be omitted because FIG. 11 is almost the same as FIG. 10; the differences between FIG. 11 and FIG. 10 are as follows: because the normalized data regarding the velocity becomes lower than the mean value when a foreign object is stuck, whether a foreign object is present is determined in step S473 depending on whether the normalized velocity value Zy(t) for the present time is lower than the normalized velocity value Zy(t−1) for the previous time; and in step S476, it is determined whether the normalized velocity value Zy(t) is below a predetermined value "−N'". Here, the value "−N'" is negative, because the velocity decreases due to a foreign object being stuck in the mold tool 10.

Figure 12B:
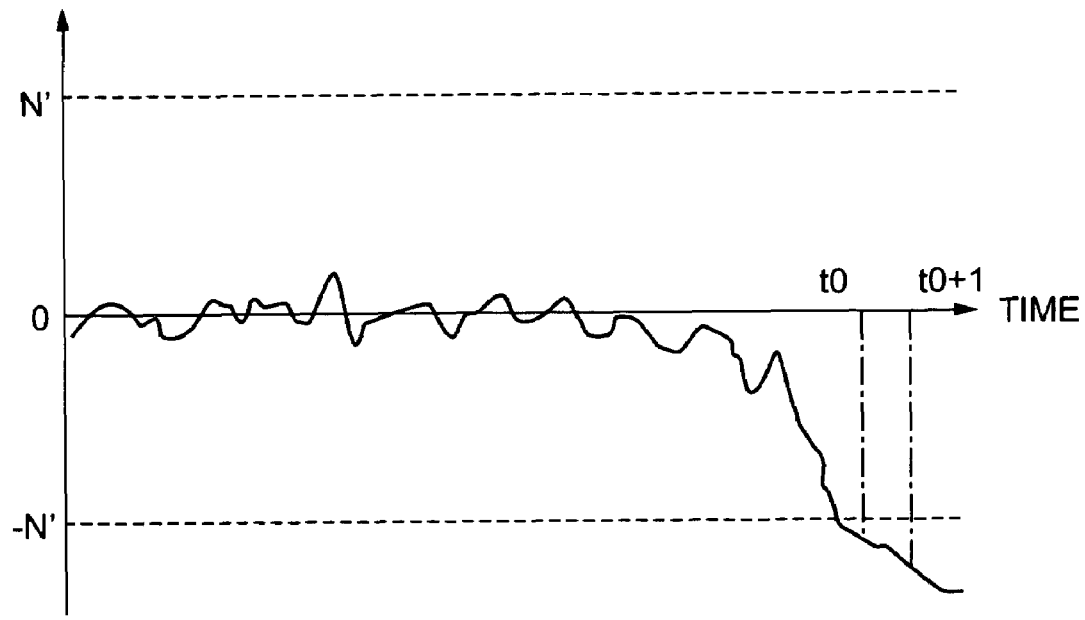

FIG. 12(b) illustrates a graph of time vs. normalized velocity value when a foreign object starts to get stuck at around time t0.

As in Embodiment 1, both the normalized current value and the normalized velocity value are used to determine whether there is an abnormality; however, only either the normalized current value Zx(t) or the normalized velocity value Zy(t) may be used to determine an abnormality. Moreover, instead of the normalized current value or the normalized velocity value, normalized values such as a normalized value regarding the position or a normalized value regarding the position deviation may be used to determine an abnormity.

Embodiment 4

In the above-described Embodiment 2, because the detected current values and the detected velocity values with respect to the number of repetitions of the mold closing operation have been stored in the memory 29r, the storage capacity for the product of the number of repetitions of the mold closing operation and the number of the sampling times has been required. In this embodiment of the invention, an example in which the storage capacity of the memory 29r is small will be described using FIG. 13.

Figures 13, 14:
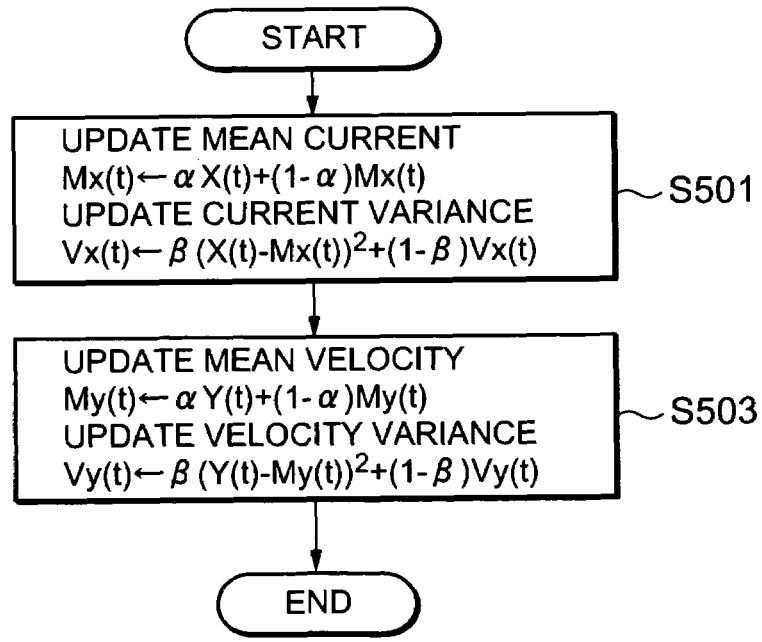
FIG. 13 is a memory state diagram indicating state of memory required for updating mean values and variance values in a fourth embodiment.
FIG. 14 is a flowchart illustrating a procedure for updating mean values and variance values in the fourth embodiment.

FIG. 13 indicates the storage structure of the memory 29r; the detected current values X(t) for the last one cycle of sampling times during the normal closing operation are stored as in FIG. 13(*a*); the mean current values Mx(t) for the corresponding sampling times are stored as in FIG. 13(*b*); and the current variance values Vx(t) for the corresponding sampling times are stored as in FIG. 13(*c*).

Next, the calculation and updating of the mean current value Mx(t) and the current variance value Vx(t) for each of the sampling times in the embodiment will be described with reference to the flowchart of FIG. 14.

The processing in FIG. 14 is executed in order to replace the processing for Embodiment 2—the updating of the mean value and the variance value in the step S117 in FIG. 4 and in the step S27 in FIG. 5 for Embodiment 1.

The malfunction detection determining unit 29 updates the mean current value Mx(t) and the current variance value Vx(t) for each of the sampling times calculated in the previous cycle according to the following equations (step S501).

$$Mx(t) \leftarrow \alpha X(t) + (1-\alpha)Mx(t) \quad (1)$$

$$Vx(t) \leftarrow \beta(X(t)-Mx(t))^2 + (1-\beta)Vx(t) \quad (2)$$

Here, $\alpha$ and $\beta$ are fixed numbers; where $0<\alpha, \beta<1$, and, more preferably, $0.01<\alpha, \beta<0.3$.

Next, the mean velocity value and the velocity variance value regarding the velocity are calculated according to a similar procedure (step S503).

It will be described that the mean current value Mx(t) and the current variance value Vx(t) calculated according to the above-described equations (1) and (2) are a type of mean value and variance value, respectively. Recursive application of the above-described equation (1) leads to the following equation.

$$Mx(t) = \alpha x^{(0)}(t) + \alpha(1-\alpha)x^{(1)}(t) + \alpha(1-\alpha)^2 x^{(2)} + \ldots \quad (3)$$

Here, $x^{(j)}(t)$ represents the detected current value at sampling time t during the mold closing operation j cycles before.

Moreover, because $\alpha + \alpha(1-\alpha) + \alpha(1-\alpha)^2 + \ldots = 1$, the value calculated according to the above-described equation (3) can be deemed a weighted arithmetic mean value from a plurality of past data values.

Furthermore, the more recent the detected values, the more the detected values are reflected in the mean value calculated according to the above-described equation (1).

Moreover, recursive application of the above-described equation (2) likewise leads to the following equation.

$$Vx(t) = \beta(x^{(0)}(t) - Mx^{(0)}(t))^2 + \\ \beta(1-\beta)(x^{(1)}(t) - Mx^{(1)}(t))^2 + \beta(1-\beta)^2(x^{(2)}(t) - Mx^{(2)}(t))^2 + \ldots \quad (4)$$

Here, $Mx^{(j)}(t)$ represents the mean value at sampling time t calculated j cycles before. As described above, the detected value sometimes gradually increases or decreases, though only by a small amount, at all sampling times during every mold closing operation due to variation in the ambient temperature, mechanical friction, or the like.

However, because such a change is extremely slow relative to the mold closing cycles, the detected values whose closing cycle numbers are close to each other for each of the sampling times tend to be very close values. Consequently, when j is a small number, the approximation according to the following equation is possible.

$$Mx^{(i)}(t) \approx Mx^{(i+j)}(t) \quad (5)$$

Accordingly, Vx(t) is expressed as in the following equation.

$$Vx(t) \approx \beta(x^{(0)}(t) - Mx^{(0)}(t))^2 + \\ \beta(1-\beta)(x^{(1)}(t) - Mx^{(0)}(t))^2 + \beta(1-\beta)^2(x^{(2)}(t) - Mx^{(0)}(t))^2 + \ldots \quad (6)$$

Here, as j becomes large, the approximation in the above-described equation (5) does not generally apply; however the coefficient $\beta(1-\beta)^j$ in the above-described equation (6) becomes small, whereby the effect of the difference from the approximation on the whole Vx(t) becomes small.

Likewise as mentioned earlier, by $\beta + \beta(1-\beta) + \beta(1-\beta)^2 + \ldots = 1$, Vx(t) can be deemed as a weighted sum of squares of the differences between the detected current values and the mean current values $Mx^{(0)}(t)$ for each of the sampling times in the past, namely a type of variance value. As in the case of the mean value, the larger the difference between the recent detected values and the mean value, the more the values are reflected in this variance value as in the mean value.

The mean values calculated according to the above-described equations (1) and (2) are mean/variance values for which the more recent the data the greater the effect. Accordingly, the mean/variance values quickly follow subtle changes or the like of the data due to the ambient temperature or repetition of the mold closing operation. The thresholds calculated from such mean/variance values are more appropriate for malfunction determination.

According to such a control device for an injection molding machine, the calculations according to the above-described equations (1) and (2) can be carried out by storing only the mean and variance values calculated during the previous mold closing operation and the detected values that have been detected this time as illustrated in FIG. 13, whereby there is a benefit in that the storage capacity of the memory 29r can be reduced.

Embodiment 5

As described in the above embodiment, the preset value N and the current malfunction counter m can be set in advance. However, it is sometimes desirable to adjust the setting of the preset value N and the current malfunction counter m in accordance with local circumstances. This is because the most appropriate preset value N and current malfunction counter m can be changed depending on the type, or the like, of the mold closing mechanism for the injection molding machine.

Figure 15A:
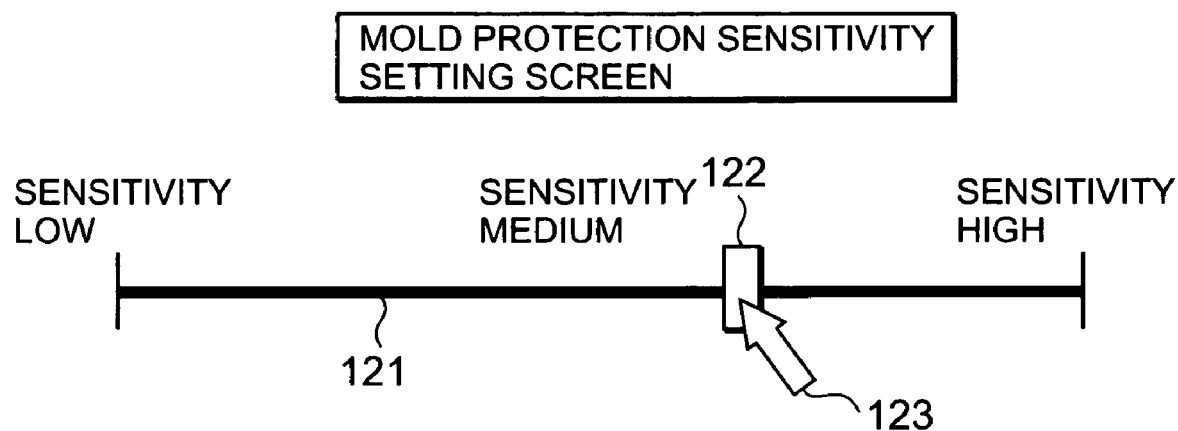
FIGS. 15a and 15b illustrate a mold-protection sensitivity setting screen according to a fifth embodiment.

Another embodiment of the invention will be described using FIG. 15. In FIG. 15(a), the operation panel includes a control 122 that moves along a linear slide bar 121, and a mouse pointer 123 for moving the control 122 linearly. A detection sensitivity display means is configured so as to indicate on one end of the slide bar 121 "Sensitivity LOW" for the sensitivity in detecting a foreign object within the mold tool 10 and on the other end of the slide bar 121 "Sensitivity HIGH" in the same way. The slide bar 121, the control 122, and the mouse pointer 123 configure an adjusting means for adjusting the level of detection sensitivity. Here, the smaller the preset value N and the current malfunction counter m are, the better the sensitivity in detecting a foreign object within the mold tool. Conversely, the larger they are, the duller the sensitivity.

For example, when the operator wants to set the sensitivity to be high, (N, m) are set equal to (3, 2); and when the operator wants to set the sensitivity to be low, (N, m) are set equal to (10, 20). Namely, when the control 122 is moved around "Sensitivity HIGH", (N, m) are set to small values; and when the control 122 is moved around "Sensitivity LOW", (N, m) are set to large values.

Figure 15B:
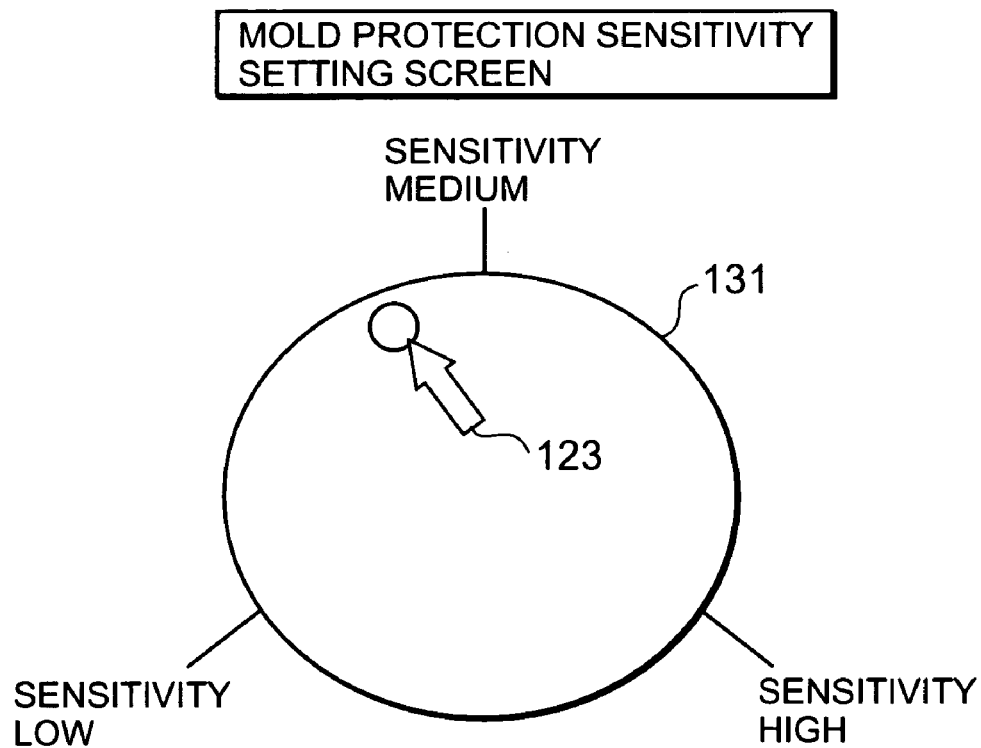

Moreover, not only moving the control 122 linearly as described above, but also rotating a volume control 131 as in FIG. 15(b) may be applicable to change the sensitivity between "Sensitivity LOW" and "Sensitivity HIGH".

The operator can visually and intuitively set the preset value N and the malfunction counter m using such a sensitivity setting device.

Embodiment 6

Figure 16A:
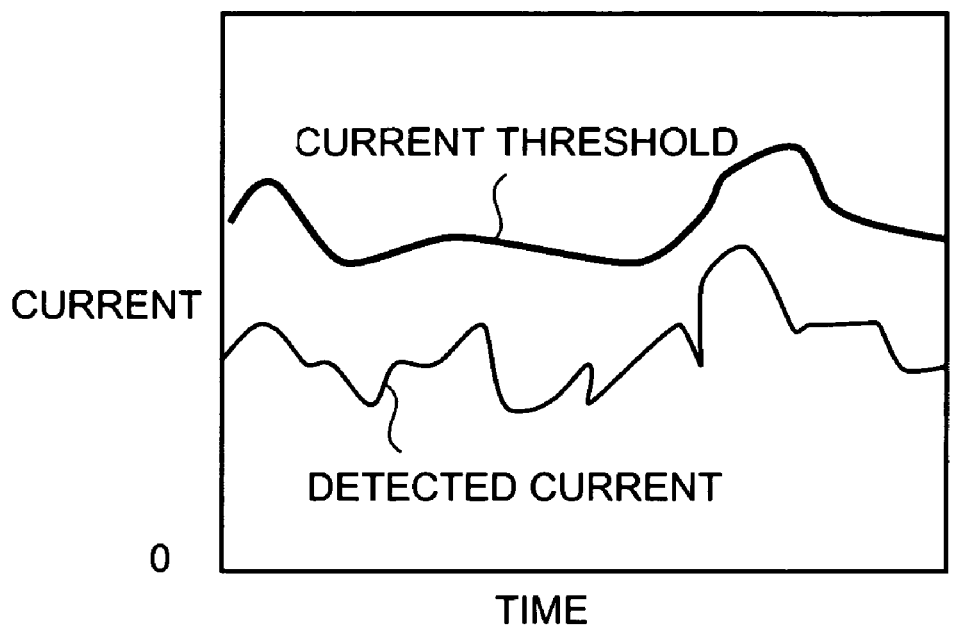
FIGS. 16a and 16b illustrate a time-current (a) and time-velocity (b) according to a sixth embodiment.
Figure 16B:
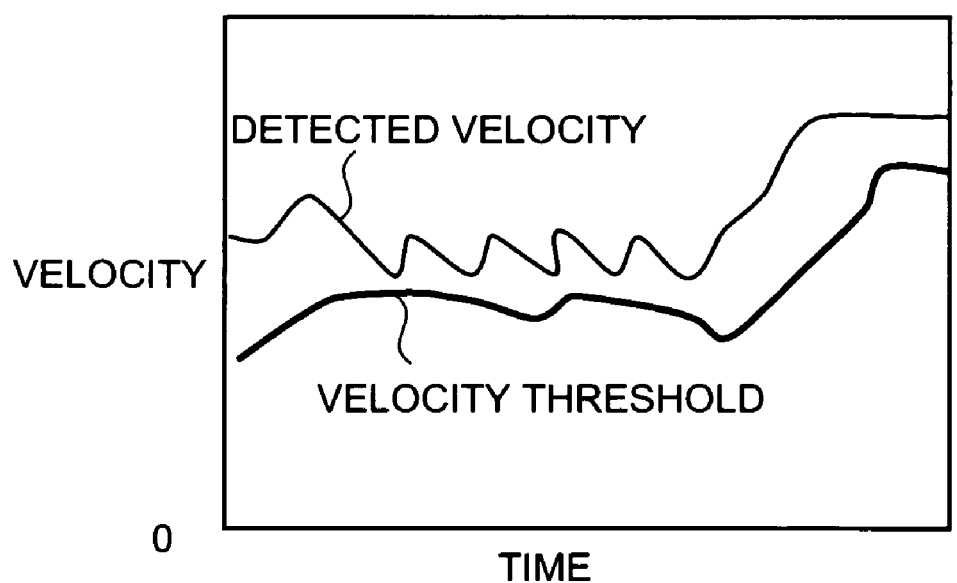

Another embodiment of the invention will be described using FIG. 16. As illustrated in FIG. 16, the current threshold Xf(t) and the detected current X(t), and the velocity threshold Yf(t) and the detected velocity Y(t), calculated as described above, are simultaneously displayed, respectively, on the display unit 31 illustrated in FIG. 1. According to this, the operator can easily check, by comparing the detected value and the threshold, whether the present mold closing operation is being performed normally. Moreover, the normalized values regarding the current or the velocity described in the above embodiment may be displayed together with the preset value N' for every sampling time.

Embodiment 7

In the above-described embodiment, the foreign object detection determining unit 29 determines whether a malfunction is present based on the detected current value and the detected velocity value at each sampling time during the mold closing operation of the mold tool 10. However, the determination may be made depending on the detected position at each sampling time. Here, the detected position can be acquired by detecting data from the encoder 21.

In a case where the position is used, when a foreign object is stuck, the position stops short of the normal state because the foreign object blocks the mold closing operation. Accordingly, the position threshold Yf(t) is expressed as in the following equation.

$$Yf(t)=My(t)-N\cdot\{Vy(t)\}^{1/2}$$

where My(t) is the mean position value, and Vy(t) is the position variance value.

The position threshold Yf(t) is set as described above, and by checking whether the detected position value is below the position threshold, a determination is made as to whether a foreign object is present.

Embodiment 8

In a control device for operating the opening/closing of the mold tool 10 using the motor 3 based on position commands, in a case where the motor is controlled based on the position deviation—the difference between the commanded position and the detected position—the position deviation corresponding to each of the sampling times may be applicable.

In a case where the position deviation is used, when a foreign object is stuck, the position deviation increases because the target position cannot be reached. Accordingly, the position deviation threshold Ef(t) is expressed as in the following equation.

$$Ef(t)=Me(t)+N\cdot\{Ve(t)\}^{1/2}$$

where Me(t) is the mean position deviation value, and Ve(t) is the position deviation variance value.

The position deviation threshold Ef(t) is set as described above, and by checking whether the detected position deviation value exceeds the position deviation threshold, a determination is made as to whether a foreign object is present.

Embodiment 9

Although in the above-described embodiments, each of the sampling times synchronized to the closing command signal for the mold tool 10 has been used for detection timing of the current values X(t) and the like, closing position command signals using positions based on the closing command signal for the mold tool 10 may be used for detection timing. More specifically, in the above-described embodiments, the control device includes the encoder 21 for detecting, synchronously with the closing command signal for the mold tool 10, the velocity or the detected position Y(t) of the motor 3 at each of the sampling times, and the current detection circuit 23 for detecting the value X(t) of the current flowing in the motor 3 at each of the sampling times. However, if using the closing position command signals for the mold tool 10 instead of the sampling times, another encoder 21 for detecting the velocity or the detected position Y(t) of the motor 3 at a large number of positions based on the closing position command signals, and another current detection circuit 23 for detecting the current values X(t) flowing in the motor 3 corresponding to a large number of positions based on the closing position command signals are employed, similar operations and benefits as in the above-described embodiments can be achieved.

INDUSTRIAL APPLICABILITY

As described above, the control device for the injection molding machine relevant to the invention is suitable for detecting a foreign object within the mold tool.

What is claimed is:

1. A control device for an injection molding machine, for opening and closing a mold tool by driving a motor based on an opening and a closing command signal, the control device comprising:
   a current detection circuit for, in a process from the mold tool being open until being closed, detecting at multiple points in time synchronized to the closing command signal the value X(t) of a current flowing in the motor;
   a memory for storing, with said process being repeated A times, respective current values X(t) corresponding to each of the points in time;
   a mean-and-variance calculating means for calculating for each of the points in time a mean value Mx(t) and a variance value Vx(t) that correspond to current values X(t) that have been read from the memory;
   a threshold calculating means for calculating a current threshold Xf(t) for each of the points in time using the mean value Mx(t) and the variance value Vx(t) from an arbitrary number of times up to (A−1) times, according to the following equation:

$$Xf(t)=Mx(t)+N\cdot\{Vx(t)\}^{1/2}$$

where N is a constant and not less than 3; and
   a determining means for comparing the current threshold Xf(t) and the current value X(t) at each of the points in time to determine whether there is an abnormality according to whether the current value X(t) exceeds the current threshold Xf(t) a predetermined number m of times.

2. A control device for an injection molding machine, for opening and closing a mold tool by driving a motor based on an opening and a closing command signal, the control device comprising:
   an encoder for, in a process from the mold tool being open until being closed, detecting at multiple points in time synchronized to the closing command signal the value Y(t) of the velocity or position of the motor;
   a memory for storing, with said process being repeated A times, respective velocity or position values Y(t) corresponding to each of the points in time;
   a mean-and-variance calculating means for calculating for each of the points in time a mean value My(t) and a variance value Vy(t) that correspond to velocity or position values Y(t) that have been read from the memory;
   a threshold calculating means for calculating a velocity or position threshold Yf(t) for each of the points in time using the mean value My(t) and the variance value Vy(t) from an arbitrary number of times up to (A−1) times, according to the following equation:

$$Yf(t)=My(t)-N\cdot\{Vy(t)\}^{1/2}$$

where N is a constant and not less than 3; and
   a determining means for comparing the threshold Yf(t) and the velocity or position value Y(t) at each of the points in time to determine whether there is an abnormality according to whether the velocity or position value Y(t) is below the threshold Yf(t) a predetermined number m of times.

3. A control device for an injection molding machine, for opening and closing a mold tool by driving a motor based on an opening and a closing command signal, the control device comprising:
   a current detection circuit for, in a process from the mold tool being open until being closed, detecting at multiple points in time synchronized to the closing command signal the value X(t) of a current flowing in the motor;
   a memory for storing, with said process being repeated A times, respective current values X(t) corresponding to each of the points in time;
   a mean-and-variance calculating means for calculating for each of the points in time a mean value Mx(t) and a variance value Vx(t) of current values X(t) that have been read from the memory;
   a normalization calculating means for converting the current values X(t) for each of the points in time into normalized values Zx(t) using the mean value Mx(t) and the variance value Vx(t) from an arbitrary number of times up to (A−1) times, according to the following equation:

$$Zx(t)=\{X(t)-Mx(t)\}/\{Vx(t)\}^{1/2};\text{ and}$$

a determining means for, after determining whether the normalized value Zx(t) at each of the points in time exceeds a predetermined value N'(N'>2), if the normalized value exceeds the predetermined value N', determining whether there is an abnormality according to whether the normalized value Zx(t) exceeds the normalized value Zx(t−1), at one point in time prior to that of the normalized value Zx(t), a predetermined number m' of times.

4. A control device for an injection molding machine, for opening and closing a mold tool by driving a motor based on an opening and a closing command signal, the control device comprising:
   an encoder for, in a process from the mold tool being open until being closed, detecting at multiple points in time synchronized to the closing command signal the value Y(t) of the velocity or position of the motor;
   a memory for storing, with said process being repeated A times, respective velocity or position values Y(t) corresponding to each of the points in time;
   a mean-and-variance calculating means for calculating for each of the points in time a mean value My(t) and a variance value Vy(t) of velocity or position values Y(t) that have been read from the memory;
   a normalization calculating means for converting the velocity or position values Y(t) for each of the points in time into normalized values Zy(t) using the mean value My(t) and the variance value Vy(t) from an arbitrary number of times up to (A−1) times, according to the following equation:

$$Zy(t)=\{Y(t)-My(t)\}/\{Vy(t)\}^{1/2};\text{ and}$$

a determining means for, after determining whether the normalized value Zy(t) at each of the points in time is below a predetermined value −N'(N'>2), if the normalized value is below the predetermined value −N', determining whether there is an abnormality according to whether the normalized value Zy(t) is below the normalized value Zy(t−1), at one point in time prior to that of the normalized value Zy(t), a predetermined number m' of times.

5. A control device for an injection molding machine, for opening and closing a mold tool by driving a motor based on an opening and a closing command signal, the control device comprising:
   an encoder for detecting the rotational position of the motor as a detected position;
   a control means for controlling the motor based on a position deviation that is the difference between a commanded position and the detected position;

a memory for storing, in a process from the mold tool being open until being closed, with said process being repeated A times, respective position deviation values E(t) corresponding to each of multiple points in time synchronized to the closing command signal;

a mean-and-variance calculating means for calculating for each of the points in time a mean value Me(t) and a variance value Ve(t) that correspond to position deviation values E(t) that have been read from the memory;

a threshold calculating means for calculating a position deviation threshold Ef(t) for each of the points in time using the mean value Me(t) and the variance value Ve(t) from an arbitrary number of times up to (A−1) times, according to the following equation:

$$Ef(t)=Me(t)+N\cdot\{Ve(t)\}^{1/2}$$

where N is a constant and not less than 3; and a determining means for comparing the position deviation threshold Ef(t) and the position deviation value E(t) at each of the points in time to determine whether there is an abnormality according to whether the position deviation value E(t) exceeds the position deviation threshold Ef(t) a predetermined number m of times.

6. A control device for an injection molding machine, for opening and closing a mold tool by driving a motor based on an opening and a closing command signal, the control device comprising:

an encoder for detecting the rotational position of the motor as a detected position;

a control means for controlling the motor based on a position deviation that is the difference between a commanded position and the detected position;

a memory for storing, in a process from the mold tool being open until being closed, with said process being repeated A times, respective position deviation values E(t) corresponding to each of multiple points in time synchronized to the closing command signal;

a mean-and-variance calculating means for calculating for each of the points in time a mean value Me(t) and a variance value Ve(t) of position deviation values E(t) that have been read from the memory;

a normalization calculating means for converting the position deviation values E(t) for each of the points in time into normalized values Ze(t) using the mean value Me(t) and the variance value Ve(t) from an arbitrary number of times up to (A−1) times, according to the following equation:

$$Ze(t)=\{E(t)-Me(t)\}/\{Ve(t)\}^{1/2};\text{ and}$$

a determining means for, after determining whether the normalized value Ze(t) at each of the points in time exceeds a predetermined value N'(N'>2), if the normalized value exceeds the predetermined value N', determining whether there is an abnormality according to whether the normalized value Ze(t) exceeds the normalized value Ze(t (1), at one point in time prior to that of the normalized value Ze(t), a predetermined number m' of times.

7. A control device for an injection molding machine according to claim 1, the control device further comprising:

an encoder for detecting the rotational position of the motor as a detected position;

a current limiter for limiting the current flowing in the motor when the current reaches a predetermined current limit value; and a control means for controlling the motor based on a position deviation that is the difference between a commanded position and the detected position;

wherein, with said process being repeated A times, the memory stores respective position deviation values E(t) corresponding to each of the points in time;

wherein the mean-and-variance calculating means calculates for each of the points in time a mean value Me(t) and a variance value Ve(t) that correspond to position deviation values E(t) that have been read from the memory;

wherein the threshold calculating means calculates a position deviation threshold Ef(t) for each of the points in time using the mean value Me(t) and the variance value Ve(t) from an arbitrary number of times up to (A (1) times, according to the following equation:

$$Ef(t)=Me(t)+N(\{Ve(t)\}½;\text{ and}$$

wherein the determining means compares the position deviation threshold Ef(t) and the position deviation value E(t) at each of the points in time to determine whether there is an abnormality according to whether the position deviation value E(t) exceeds the position deviation threshold Ef(t) the predetermined number m of times.

8. A control device for an injection molding machine according to claim 3, the control device further comprising:

an encoder for detecting the rotational position of the motor as a detected position;

a current limiter for limiting the current flowing in the motor when the current reaches a predetermined current limit value;

a control means for controlling the motor based on a position deviation that is the difference between a commanded position and the detected position; and a threshold calculating means;

wherein, with said process being repeated A times, the memory stores respective position deviation values E(t) corresponding to each of the points in time;

wherein the mean-and-variance calculating means calculates for each of the points in time a mean value Me(t) and a variance value Ve(t) that correspond to position deviation values E(t) that have been read from the memory;

wherein the threshold calculating means calculates a position deviation threshold Ef(t) for each of the points in time using the mean value Me(t) and the variance value Ve(t) from an arbitrary number of times up to (A (1) times, according to the following equation:

$$Ef(t)=Me(t)+N(\{Ve(t)\}½$$

where N is a constant and not less than 3; and wherein the determining means compares the position deviation threshold Ef(t) and the position deviation value E(t) at each of the points in time to determine whether there is an abnormality according to whether the position deviation value E(t) exceeds the position deviation threshold Ef(t) a predetermined number m of times.

9. A control device for an injection molding machine according to claim 1, the control device further comprising:

an encoder for detecting the rotational position of the motor as a detected position;

a current limiter for limiting the current flowing in the motor when the current reaches a predetermined current limit value;

a control means for controlling the motor based on a position deviation that is the difference between a commanded position and the detected position; and a normalization calculating means;

wherein, with said process being repeated A times, the memory stores respective position deviation values E(t) corresponding to each of the points in time;

wherein the mean-and-variance calculating means calculates for each of the points in time a mean value Me(t) and a variance value Ve(t) of position deviation values E(t) that have been read from the memory;

wherein the normalization calculating means converts the position deviation values E(t) for each of the points in time into normalized values Ze(t) using the mean value Me(t) and the variance value Ve(t) from an arbitrary number of times up to (A−1) times, according to the following equation:

$$Ze(t)=\{E(t)(Me(t)\}/\{Ve(t)\}^{1/2}; \text{ and}$$

wherein the determining means, after determining whether the normalized value Ze(t) at each of the points in time exceeds a predetermined value N'(N'>2), if the normalized value exceeds the predetermined value N', determines whether there is an abnormality according to whether the normalized value Ze(t) exceeds the normalized value Ze(t (1), at one point in time prior to that of the normalized value Ze(t), a predetermined number m' of times.

10. A control device for an injection molding machine according to claim 3, the control device further comprising:

an encoder for detecting the rotational position of the motor as a detected position;

a current limiter for limiting the current flowing in the motor when the current reaches a predetermined current limit value; and a control means for controlling the motor based on a position deviation that is the difference between a commanded position and the detected position;

wherein, with said process being repeated A times, the memory stores respective position deviation values E(t) corresponding to each of the points in time;

wherein the mean-and-variance calculating means calculates for each of the points in time a mean value Me(t) and a variance value Ve(t) of position deviation values E(t) that have been read from the memory;

wherein the normalization calculating means converts the position deviation values E(t) for each of the points in time into normalized values Ze(t) using the mean value Me(t) and the variance value Ve(t) from an arbitrary number of times up to (A (1) times, according to the following equation:

$$Ze(t)=\{E(t)(Me(t)\}/\{Ve(t)\}^{1/2}; \text{ and}$$

wherein the determining means, after determining whether the normalized value Ze(t) at each of the points in time exceeds the predetermined value N'(N'>2), if the normalized value exceeds the predetermined value N', determines whether there is an abnormality according to whether the normalized value Ze(t) exceeds the normalized value Ze(t (1), at one point in time prior to that of the normalized value Ze(t), the predetermined number m' of times.

11. A control device for an injection molding machine according to claim 1, the control device further comprising:

a current limiter for limiting, in the process from the mold tool being open until being closed, the current flowing in the motor when the current reaches a predetermined current limit value; and an encoder for, in the process from the mold tool being open until being closed, detecting at multiple points in time synchronized to the closing command signal the value Y(t) of the velocity or position of the motor;

wherein, with said process being repeated A times, the memory stores respective velocity or position values Y(t) corresponding to each of the points in time;

wherein the mean-and-variance calculating means calculates for each of the points in time a mean value My(t) and a variance value Vy(t) that correspond to velocity or position values Y(t) that have been read from the memory;

wherein the threshold calculating means calculates a threshold Yf(t) for each of the points in time using the mean value My(t) and the variance value Vy(t) from an arbitrary number of times up to (A−1) times, according to the following equation:

$$Yf(t)=My(t)-N\cdot\{Vy(t)\}^{1/2}; \text{ and}$$

wherein the determining means compares the threshold Yf(t) and the velocity or position value Y(t) at each of the points in time to determine whether there is an abnormality according to whether the velocity or position value Y(t) is below the threshold Yf(t) the predetermined number m of times.

12. A control device for an injection molding machine according to claim 3, the control device further comprising:

a current limiter for limiting, in the process from the mold tool being open until being closed, the current flowing in the motor when the current reaches a predetermined current limit value;

an encoder for, in the process from the mold tool being open until being closed, detecting at multiple points in time synchronized to the closing command signal the value Y(t) of the velocity or position of the motor; and a threshold calculating means;

wherein, with said process being repeated A times, the memory stores respective velocity or position values Y(t) corresponding to each of the points in time;

wherein the mean-and-variance calculating means calculates for each of the points in time a mean value My(t) and a variance value Vy(t) that correspond to velocity or position values Y(t) that have been read from the memory;

wherein the threshold calculating means calculates a threshold Yf(t) for each of the points in time using the mean value My(t) and the variance value Vy(t) from an arbitrary number of times up to (A−1) times, according to the following equation:

$$Yf(t)=My(t)-N\cdot\{Vy(t)\}^{1/2}$$

where N is a constant and not less than 3; and wherein the determining means compares the threshold Yf(t) and the velocity or position value Y(t) at each of the points in time to determine whether there is an abnormality according to whether the velocity or position value Y(t) is below the threshold Yf(t) a predetermined number m of times.

13. A control device for an injection molding machine according to claim 1, the control device further comprising:

a current limiter for limiting, in the process from the mold tool being open until being closed, the current flowing in the motor when the current reaches a predetermined current limit value;

an encoder for, in the process from the mold tool being open until being closed, detecting at multiple points in time synchronized to the closing command signal the value Y(t) of the velocity or position of the motor; and a normalization calculating means;

wherein, with said process being repeated A times, the memory stores respective velocity or position values Y(t) corresponding to each of the points in time;

wherein the mean-and-variance calculating means calculates for each of the points in time a mean value My(t) and a variance value Vy(t) of velocity or position values Y(t) that have been read from the memory;

wherein the normalization calculating means converts the velocity or position values Y(t) for each of the points in time into normalized values Zy(t) using the mean value My(t) and the variance value Vy(t) from an arbitrary number of times up to (A−1) times, according to the following equation:

$$Zy(t)=\{Y(t)-My(t)\}/\{Vy(t)\}^{1/2}; \text{ and}$$

wherein, after determining whether the normalized value Zy(t) at each of the points in time is below a predetermined value −N'(N'>2), if the normalized value is below the predetermined value −N', the determining means determines whether there is an abnormality according to whether the normalized value Zy(t) is below the normalized value Zy(t−1), at one point in time prior to that of the normalized value Zy(t), a predetermined number m' of times.

14. A control device for an injection molding machine according to claim 3, the control device further comprising:

a current limiter for limiting, in the process from the mold tool being open until being closed, the current flowing in the motor when the current reaches a predetermined current limit value; and an encoder for, in the process from the mold tool being open until being closed, detecting at multiple points in time synchronized to the closing command signal the value Y(t) of the velocity or position of the motor;

wherein, with said process being repeated A times, the memory stores respective velocity or position values Y(t) corresponding to each of the points in time;

wherein the mean-and-variance calculating means calculates for each of the points in time a mean value My(t) and a variance value Vy(t) of velocity or position values Y(t) that have been read from the memory;

wherein the normalization calculating means converts the velocity or position values Y(t) for each of the points in time into normalized values Zy(t) using the mean value My(t) and the variance value Vy(t) from an arbitrary number of times up to (A−1) times, according to the following equation:

$$Zy(t)=\{Y(t)-My(t)\}/\{Vy(t)\}^{1/2}; \text{ and}$$

wherein, after determining whether the normalized value Zy(t) at each of the points in time is below the predetermined value −N'(N'>2), if the normalized value is below the predetermined value −N', the determining means determines whether there is an abnormality according to whether the normalized value Zy(t) is below the normalized value Zy(t−1), at one point in time prior to that of the normalized value Zy(t), the predetermined number m' of times.

15. A control device for an injection molding machine according to claim 1, wherein the mean-and-variance calculating means calculates the mean value Mx(t) and the variance value Vx(t) from the current values X(t) during the latest K cycles of the mold closing operation.

16. A control device for an injection molding machine according to claim 2, wherein the mean-and-variance calculating means calculates the mean value My(t) and the variance value Vy(t) from the velocity or position values Y(t) during the latest K cycles of the mold closing operation.

17. A control device for an injection molding machine according to claim 3, wherein the mean-and-variance calculating means calculates the mean value Mx(t) and the variance value Vx(t) from the current values X(t) during the latest K cycles of the mold closing operation.

18. A control device for an injection molding machine according to claim 4, wherein the mean-and-variance calculating means calculates the mean value My(t) and the variance value Vy(t) from the velocity or position values Y(t) during the latest K cycles of the mold closing operation.

19. A control device for an injection molding machine according to claim 1, wherein the mean-and-variance calculating means calculates the mean value Mx(t) and the variance value Vx(t) from the current value X(t) during the most recent mold closing operation, and from the mean value Mx(t) and the variance value Vx(t) during the previous mold closing operation.

20. A control device for an injection molding machine according to claim 2, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

21. A control device for an injection molding machine according to claim 3, wherein the mean-and-variance calculating means calculates the mean value Mx(t) and the variance value Vx(t) from the current value X(t) during the most recent mold closing operation, and from the mean value Mx(t) and the variance value Vx(t) during the previous mold closing operation.

22. A control device for an injection molding machine according to claim 4, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

23. A control device for an injection molding machine according to claim 5, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

24. A control device for an injection molding machine according to claim 6, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

25. A control device for an injection molding machine according to claim 7, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

26. A control device for an injection molding machine according to claim 8, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

27. A control device for an injection molding machine according to claim 9, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

28. A control device for an injection molding machine according to claim 10, wherein the mean-and-variance calculating means calculates the mean value Me(t) and the variance value Ve(t) from the position deviation value E(t) during the most recent mold closing operation, and from the mean value Me(t) and the variance value Ve(t) during the previous mold closing operation.

29. A control device for an injection molding machine according to claim 11, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

30. A control device for an injection molding machine according to claim 12, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

31. A control device for an injection molding machine according to claim 13, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

32. A control device for an injection molding machine according to claim 14, wherein the mean-and-variance calculating means calculates the mean value My(t) and the variance value Vy(t) from the velocity or position value Y(t) during the most recent mold closing operation, and from the mean value My(t) and the variance value Vy(t) during the previous mold closing operation.

33. A control device for an injection molding machine according to claim 1,
wherein the memory stores a plurality of combinations of said value N and said number m; and
the control device further comprises:
a detection sensitivity display means for displaying, based on the combinations of said value N and said number m, the level of sensitivity in detecting that a foreign object is present within the mold tool; and
an adjusting means for adjusting said level based on what is displayed.

34. A control device for an injection molding machine according to claim 2,
wherein the memory stores a plurality of combinations of said value N and said number m; and
the control device further comprises:
a detection sensitivity display means for displaying, based on the combinations of said value N and said number m, the level of sensitivity in detecting that a foreign object is present within the mold tool; and
an adjusting means for adjusting said level based on what is displayed.

35. A control device for an injection molding machine according to claim 3,
wherein the memory stores a plurality of combinations of said value N' and said number m'; and
the control device further comprises:
a detection sensitivity display means for displaying, based on the combinations of said value N' and said number m', the level of sensitivity in detecting that a foreign object is present within the mold tool; and
an adjusting means for adjusting said level based on what is displayed.

36. A control device for an injection molding machine according to claim 4,
wherein the memory stores a plurality of combinations of said value N' and said number m'; and
the control device further comprises:
a detection sensitivity display means for displaying, based on the combinations of said value N' and said number m', the level of sensitivity in detecting that a foreign object is present within the mold tool; and
an adjusting means for adjusting said level based on what is displayed.

37. A control device for an injection molding machine according to claim 5, wherein the memory stores a plurality of combinations of said value N and said number m; and
the control device further comprises:
a detection sensitivity display means for displaying, based on the combinations of said value N and said number m, the level of sensitivity in detecting that a foreign object is present within the mold tool; and
an adjusting means for adjusting said level based on what is displayed.

38. A control device for an injection molding machine according to claim 6,
wherein the memory stores a plurality of combinations of said value N' and said number m'; and
the control device further comprises:
a detection sensitivity display means for displaying, based on the combinations of said value N' and said number m', the level of sensitivity in detecting that a foreign object is present within the mold tool; and
an adjusting means for adjusting said level based on what is displayed.

39. A control device for an injection molding machine according to claim 7,
wherein the memory stores a plurality of combinations of said value N and said number m; and
the control device further comprises:
a detection sensitivity display means for displaying, based on the combinations of said value N and said number m, the level of sensitivity in detecting that a foreign object is present within the mold tool; and
an adjusting means for adjusting said level based on what is displayed.

40. A control device for an injection molding machine according to claim 8,
wherein the memory stores a plurality of combinations of said value N and said number m; and the control device further comprises:
- a detection sensitivity display means for displaying, based on the combinations of said value N and said number m, the level of sensitivity in detecting that a foreign object is present within the mold tool; and
- an adjusting means for adjusting said level based on what is displayed.

41. A control device for an injection molding machine according to claim 9,
   - wherein the memory stores a plurality of combinations of said value N' and said number m'; and
   - the control device further comprises:
      - a detection sensitivity display means for displaying, based on the combinations of said value N' and said number m', the level of sensitivity in detecting that a foreign object is present within the mold tool; and
      - an adjusting means for adjusting said level based on what is displayed.

42. A control device for an injection molding machine according to claim 10, wherein the memory stores a plurality of combinations of said value N' and said number m'; and
   - the control device further comprises:
      - a detection sensitivity display means for displaying, based on the combinations of said value N' and said number m', the level of sensitivity in detecting that a foreign object is present within the mold tool; and
      - an adjusting means for adjusting said level based on what is displayed.

43. A control device for an injection molding machine according to claim 11, wherein the memory stores a plurality of combinations of said value N and said number m; and
   - the control device further comprises:
     - a detection sensitivity display means for displaying, based on the combinations of said value N and said number m, the level of sensitivity in detecting that a foreign object is present within the mold tool; and
     - an adjusting means for adjusting said level based on what is displayed.

44. A control device for an injection molding machine according to claim 12,
   - wherein the memory stores a plurality of combinations of said value N and said number m; and
   - the control device further comprises:
      - a detection sensitivity display means for displaying, based on the combinations of said value N and said number m, the level of sensitivity in detecting that a foreign object is present within the mold tool; and
      - an adjusting means for adjusting said level based on what is displayed.

45. A control device for an injection molding machine according to claim 13,
   - wherein the memory stores a plurality of combinations of said value N' and said number m'; and
   - the control device further comprises:
      - a detection sensitivity display means for displaying, based on the combinations of said value N' and said number m', the level of sensitivity in detecting that a foreign object is present within the mold tool; and
      - an adjusting means for adjusting said level based on what is displayed.

46. A control device for an injection molding machine according to claim 14,
   - wherein the memory stores a plurality of combinations of said value N' and said number m'; and
   - the control device further comprises:
      - a detection sensitivity display means for displaying, based on the combinations of said value N' and said number m', the level of sensitivity in detecting that a foreign object is present within the mold tool; and
      - an adjusting means for adjusting said level based on what is displayed.

47. A control device for an injection molding machine according to claim 1, the control device further comprising a display means for visually displaying the current values $X(t)$ and the current thresholds $Xf(t)$.

48. A control device for an injection molding machine according to claim 2, the control device further comprising a display means for visually displaying the velocity or position values $Y(t)$ and the velocity or position thresholds $Yf(t)$.

49. A control device for an injection molding machine according to claim 5, the control device further comprising a display means for visually displaying the position deviation values $E(t)$ and the position deviation thresholds $Ef(t)$.

50. A control device for an injection molding machine according to claim 7, further comprising a display means for visually displaying the position deviation values $E(t)$ and the position deviation thresholds $Ef(t)$.

51. A control device for an injection molding machine according to claim 8, further comprising a display means for visually displaying the position deviation values $E(t)$ and the position deviation thresholds $Ef(t)$.

52. A control device for an injection molding machine according to claim 11, the control device further comprising a display means for visually displaying the velocity or position values $Y(t)$ and the velocity or position thresholds $Yf(t)$.

53. A control device for an injection molding machine according to claim 12, the control device further comprising a display means for visually displaying the velocity or position values $Y(t)$ and the velocity or position thresholds $Yf(t)$.

54. A control device for an injection molding machine, for opening and closing a mold tool by driving a motor based on an opening and a closing command signal, the control device comprising:
   - a current detection circuit for, in a process from the mold tool being open until being closed, detecting at multiple positions based on closing position command signals the value $X(t)$ of a current flowing in the motor;
   - a memory for storing, with said process being repeated A times, respective current values $X(t)$ corresponding to each of the detected positions;
   - a mean-and-variance calculating means for calculating for each of the detected positions a mean value $Mx(t)$ and a variance value $Vx(t)$ that correspond to current values $X(t)$ that have been read from the memory;
   - a threshold calculating means for calculating a current threshold $Xf(t)$ for each of the detected positions using the mean value $Mx(t)$ and the variance value $Vx(t)$ from an arbitrary number of times up to $(A-1)$ times, according to the following equation:

$$Xf(t)=Mx(t)+N\cdot\{Vx(t)\}^{1/2}$$

where N is a constant and not less than 3; and
   - a determining means for comparing the current threshold $Xf(t)$ and the current value $X(t)$ at each of the detected positions to determine whether there is an abnormality according to whether the current value $X(t)$ exceeds the current threshold $Xf(t)$ a predetermined number m of times.

55. A control device for an injection molding machine, for opening and closing a mold tool by driving a motor based on an opening and a closing command signal, the control device comprising:

an encoder for, in a process from the mold tool being open until being closed, detecting at multiple positions based on closing position command signals the value Y(t) of the velocity or position of the motor;

a memory for storing, with said process being repeated A times, respective velocity or position values Y(t) corresponding to each of the detected positions;

a mean-and-variance calculating means for calculating for each of the detected positions a mean value My(t) and a variance value Vy(t) that correspond to velocity or position values Y(t) that have been read from the memory;

a threshold calculating means for calculating a velocity or position threshold Yf(t) for each of the detected positions using the mean value My(t) and the variance value Vy(t) from an arbitrary number of times up to (A−1) times, according to the following equation:

$$Yf(t) = My(t) - N \cdot \{Vy(t)\}^{1/2}$$

where N is a constant and not less than 3; and a determining means for comparing the threshold Yf(t) and the velocity or position value Y(t) at each of the detected positions to determine whether there is an abnormality according to whether the velocity or position value Y(t) is below the threshold Yf(t) a predetermined number m of times.

56. A control device for an injection molding machine, for opening and closing a mold tool by driving a motor based on an opening and a closing command signal, the control device comprising:

a current detection circuit for, in a process from the mold tool being open until being closed, detecting at multiple positions based on closing position command signals the value X(t) of a current flowing in the motor;

a memory for storing, with said process being repeated A times, respective current values X(t) corresponding to each of the detected positions;

a mean-and-variance calculating means for calculating for each of the detected positions a mean value Mx(t) and a variance value Vx(t) of current values X(t) that have been read from the memory;

a normalization calculating means for converting the current values X(t) for each of the detected positions into normalized values Zx(t) using the mean value Mx(t) and the variance value Vx(t) from an arbitrary number of times up to (A−1) times, according to the following equation:

$$Zx(t) = \{X(t) - Mx(t)\} / \{Vx(t)\}^{1/2}; \text{ and}$$

a determining means for, after determining whether the normalized value Zx(t) at each of the detected positions exceeds a predetermined value N'(N'>2), if the normalized value exceeds the predetermined value N', determining whether there is an abnormality according to whether the normalized value Zx(t) exceeds the normalized value Zx(t (1), at one point in time prior to that of the normalized value Zx(t), a predetermined number m' of times.

57. A control device for an injection molding machine, for opening and closing a mold tool by driving a motor based on an opening and a closing command signal, the control device comprising:

an encoder for, in a process from the mold tool being open until being closed, detecting at multiple positions based on closing position command signals the value Y(t) of the velocity or position of the motor;

a memory for storing, with said process being repeated A times, respective velocity or position values Y(t) corresponding to each of the detected positions;

a mean-and-variance calculating means for calculating for each of the detected positions a mean value My(t) and a variance value Vy(t) of velocity or position values Y(t) that have been read from the memory;

a normalization calculating means for converting the velocity or position values Y(t) for each of the detected positions into normalized values Zy(t) using the mean value My(t) and the variance value Vy(t) from an arbitrary number of times up to (A (1) times, according to the following equation:

$$Zy(t) = \{Y(t)(My(t)\} / \{Vy(t)\}^{1/2}; \text{ and}$$

a determining means for, after determining whether the normalized value Zy(t) at each of the detected positions is below a predetermined value (N'(N'>2), if the normalized value is below the predetermined value (N', determining whether there is an abnormality according to whether the normalized value Zy(t) is below the normalized value Zy(t (1), at one point in time prior to that of the normalized value Zy(t), a predetermined number m' of times.

* * * * *